United States Patent [19]
Slattery

[11] Patent Number: 5,848,146
[45] Date of Patent: Dec. 8, 1998

[54] AUDIO SYSTEM FOR CONFERENCING/PRESENTATION ROOM

[75] Inventor: Ernest Michael Slattery, Everett, Wash.

[73] Assignee: Rane Corporation, Mukilteo, Wash.

[21] Appl. No.: 644,233

[22] Filed: May 10, 1996

[51] Int. Cl.⁶ ........................................... H04M 9/08
[52] U.S. Cl. ..................... 379/390; 379/388; 379/406; 379/410; 379/420; 381/111; 381/119
[58] Field of Search .................... 379/406, 410, 379/202, 388, 390, 203, 204, 205, 206, 389; 370/285, 286, 287, 288, 289, 290, 291, 292; 371/110, 119

[56] References Cited

U.S. PATENT DOCUMENTS

| | | | |
|---|---|---|---|
| 3,493,681 | 2/1970 | Richards | 369/3 |
| 4,449,238 | 5/1984 | Lee et al. | 381/110 |
| 4,456,789 | 6/1984 | Groves et al. | 379/202 |
| 4,535,445 | 8/1985 | Lane et al. | 370/268 |
| 4,653,102 | 3/1987 | Hansen | 381/92 |
| 4,656,625 | 4/1987 | Nojiri et al. | 370/267 |
| 4,658,425 | 4/1987 | Julstrom | 381/81 |
| 4,686,698 | 8/1987 | Tompkins et al. | 348/320 |
| 4,703,349 | 10/1987 | Bernstein | 348/403 |
| 4,710,917 | 12/1987 | Tompkins et al. | 370/260 |
| 4,712,231 | 12/1987 | Julstrom | 379/202 |
| 4,716,585 | 12/1987 | Tompkins et al. | 379/202 |
| 4,839,743 | 6/1989 | Best et al. | 386/31 |
| 4,847,829 | 7/1989 | Tompkins et al. | 370/260 |
| 4,855,730 | 8/1989 | Venners et al. | 340/825 |
| 4,872,195 | 10/1989 | Leonard | 379/40 |
| 4,937,856 | 6/1990 | Natarajan | 379/158 |
| 4,979,217 | 12/1990 | Shipley | 381/81 |
| 4,991,166 | 2/1991 | Julstrom | 370/288 |
| 5,014,267 | 5/1991 | Tompkins et al. | 370/259 |
| 5,027,393 | 6/1991 | Yamamura et al. | 379/410 |
| 5,033,082 | 7/1991 | Eriksson et al. | 379/410 |
| 5,034,808 | 7/1991 | Murray | 348/8 |
| 5,157,653 | 10/1992 | Genter | 370/288 |
| 5,249,225 | 9/1993 | Williams | 379/404 |
| 5,263,019 | 11/1993 | Chu | 370/288 |
| 5,263,020 | 11/1993 | Yatsuzuka et al. | 370/289 |
| 5,280,525 | 1/1994 | Wesel | 379/400 |
| 5,283,646 | 2/1994 | Bruder | 348/415 |
| 5,283,784 | 2/1994 | Genter | 370/288 |
| 5,291,558 | 3/1994 | Ross | 381/107 |
| 5,297,210 | 3/1994 | Julstrom | 381/66 |
| 5,305,307 | 4/1994 | Chu | 370/288 |
| 5,386,465 | 1/1995 | Addeo et al. | 379/202 |

OTHER PUBLICATIONS

1992 Filing Receipt—referencing earlier U.S. Patent Application SN 07/967,387 by the same inventor/applicant—now abandoned.
Jul. 1, 1992, Document referring to Related Products.
Jan. 9, 1996, Search results "Claims"database, pp. 1–6.

*Primary Examiner*—Daniel S. Hunter
*Assistant Examiner*—Jacques M. Saint-Surin
*Attorney, Agent, or Firm*—Graybeal Jackson Haley LLP

[57] ABSTRACT

A multiport bridge controlled by the intelligence of a programmed microcontroller selectively channels audio from a plurality of input ports to a plurality of output ports including a room program output. Coupled to one of the bridge input ports is at least one gated microphone mixer, including multiple microphone channels and an acoustical echo canceller. Expandability is provided by a second, third or up to n microphone mixers each having a separate echo canceller for the associated group of microphone inputs.

16 Claims, 23 Drawing Sheets

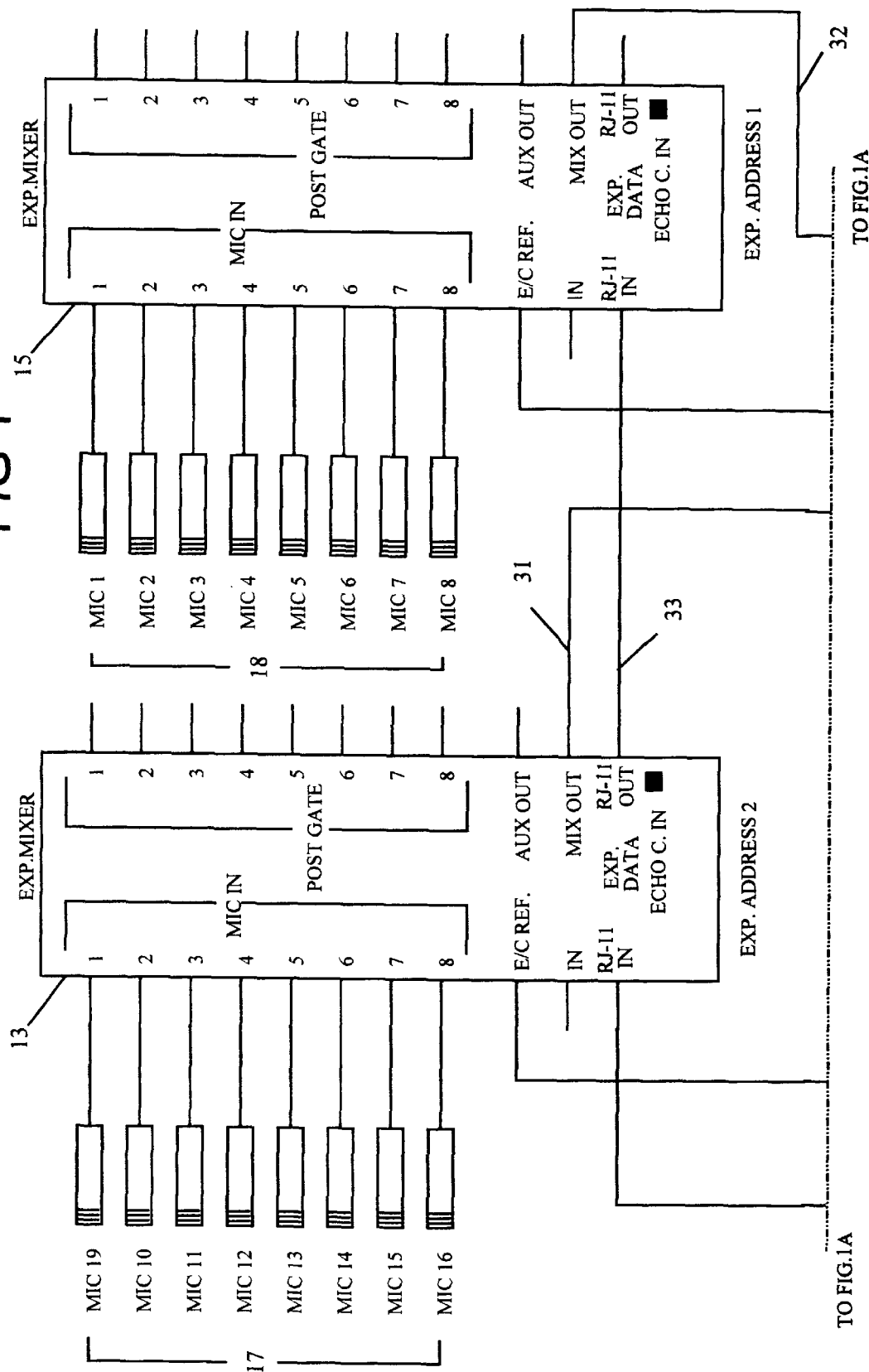

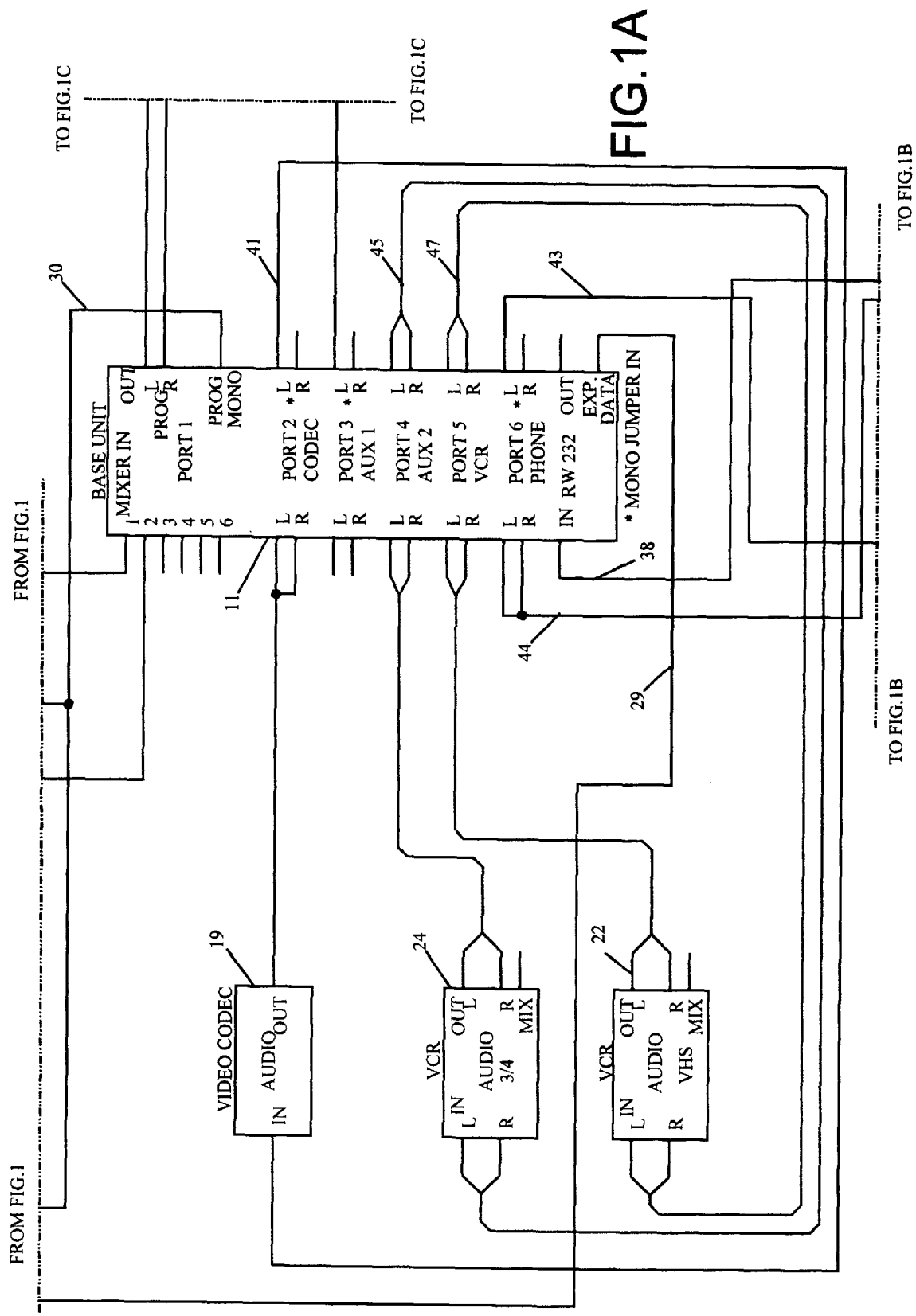

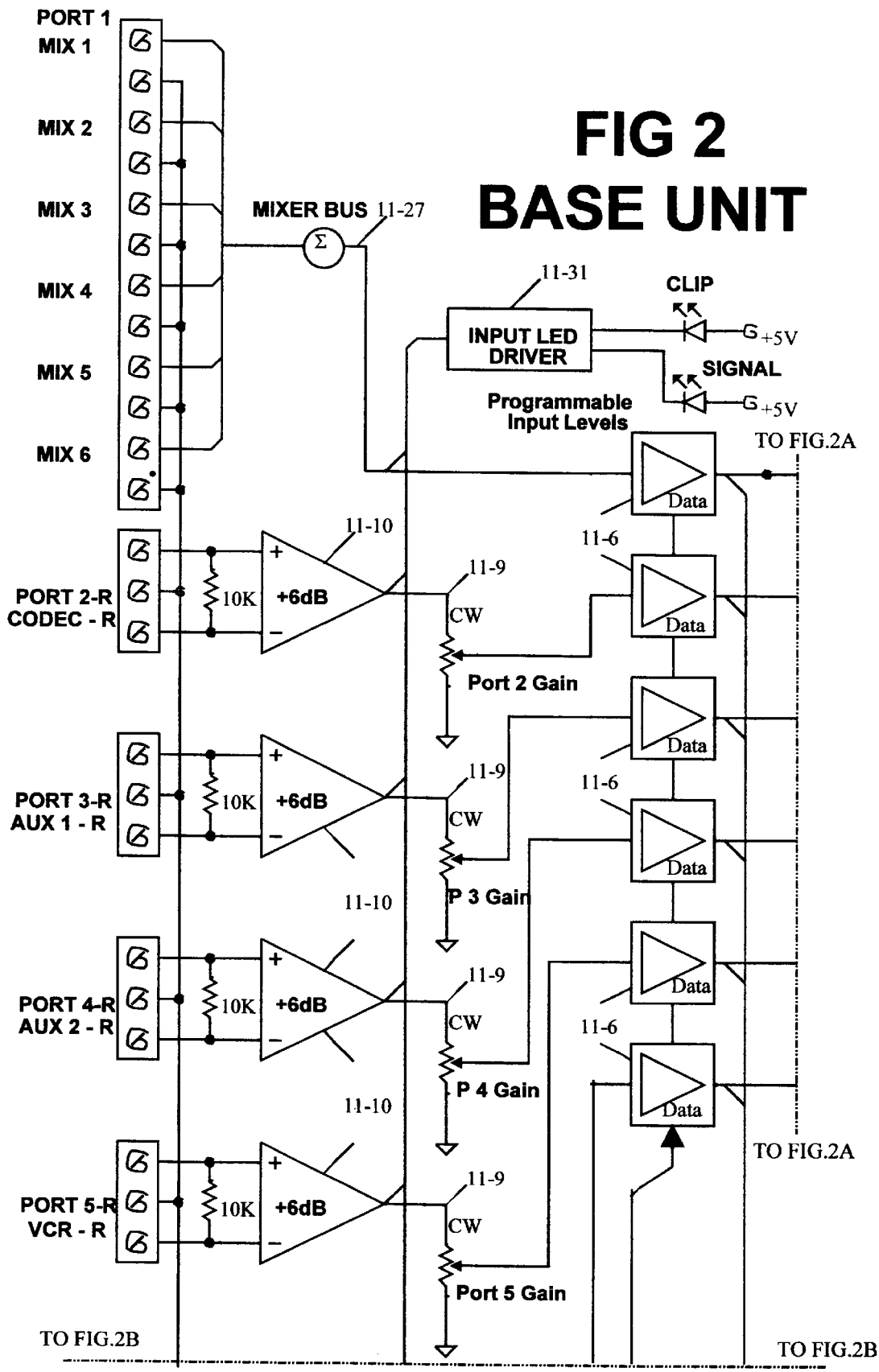

AUDIO BRIDGE

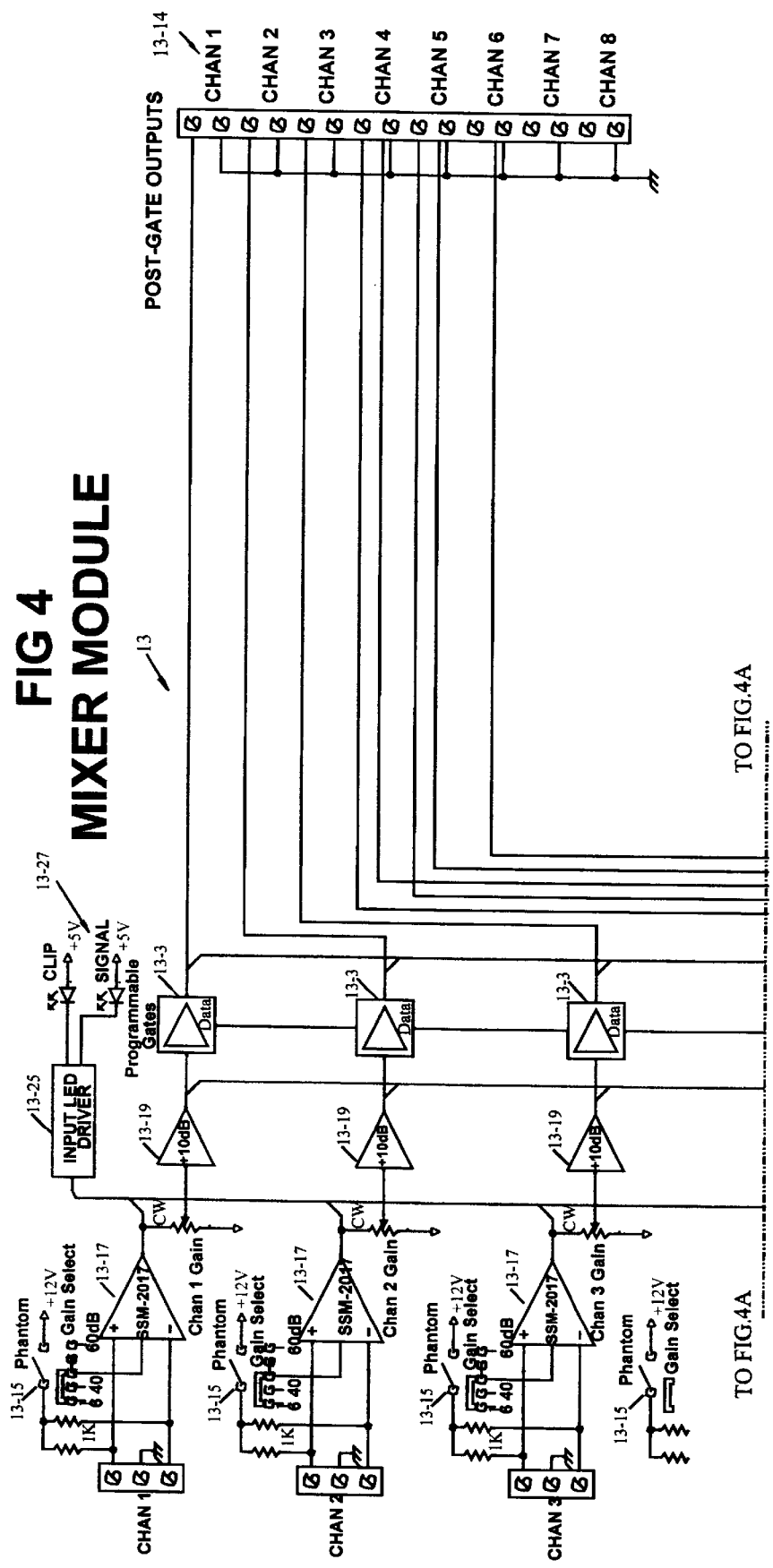

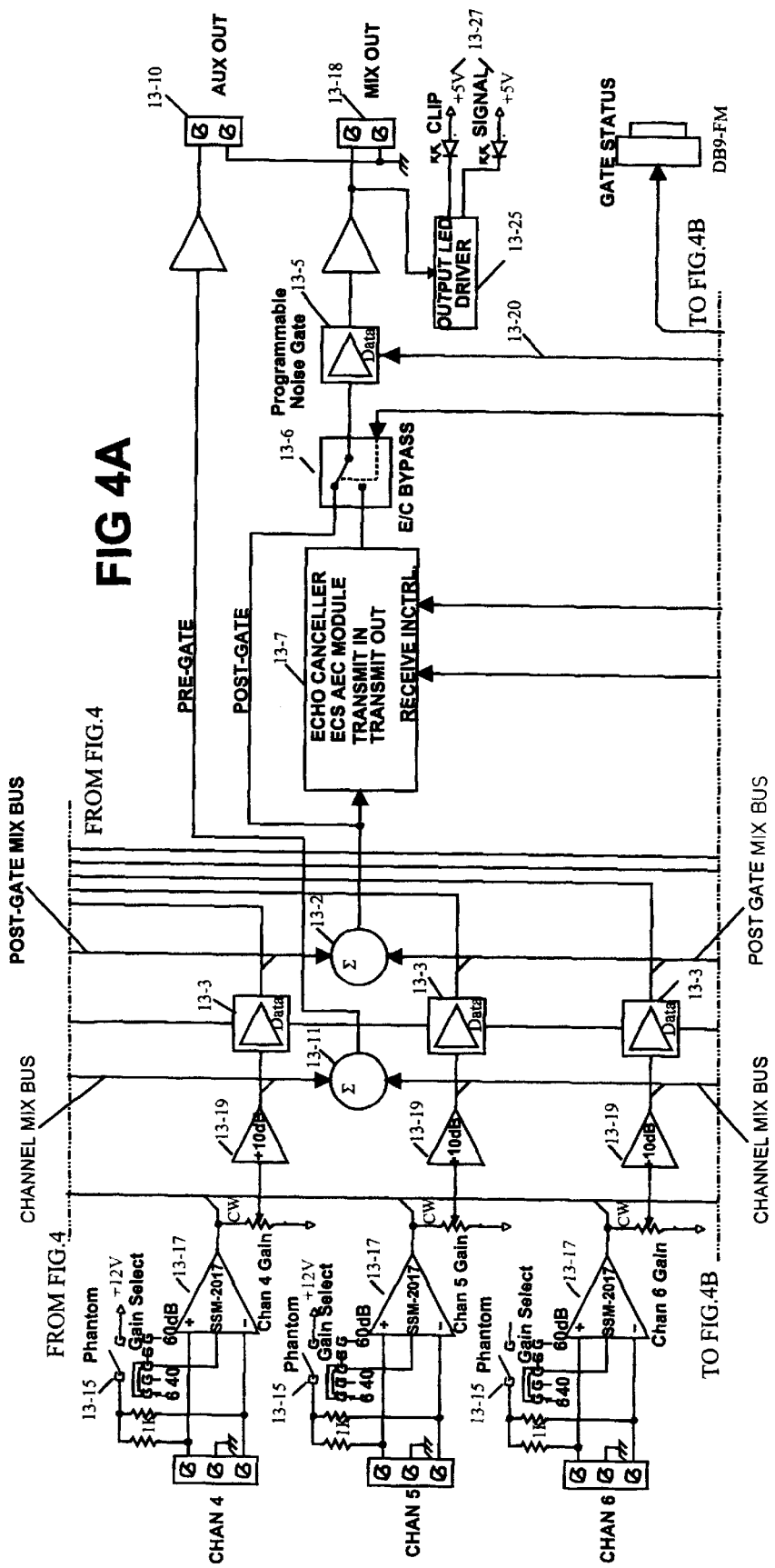

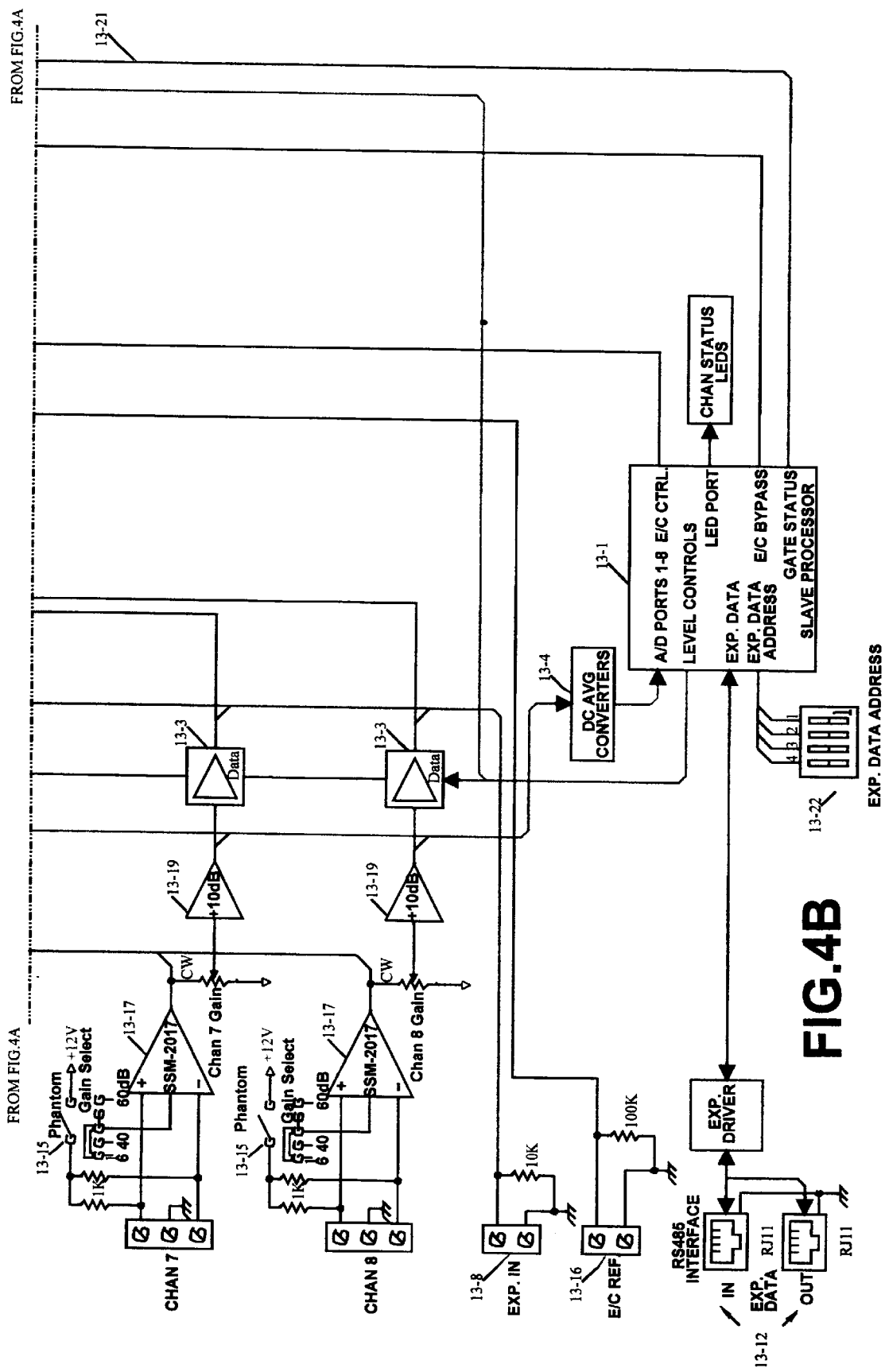

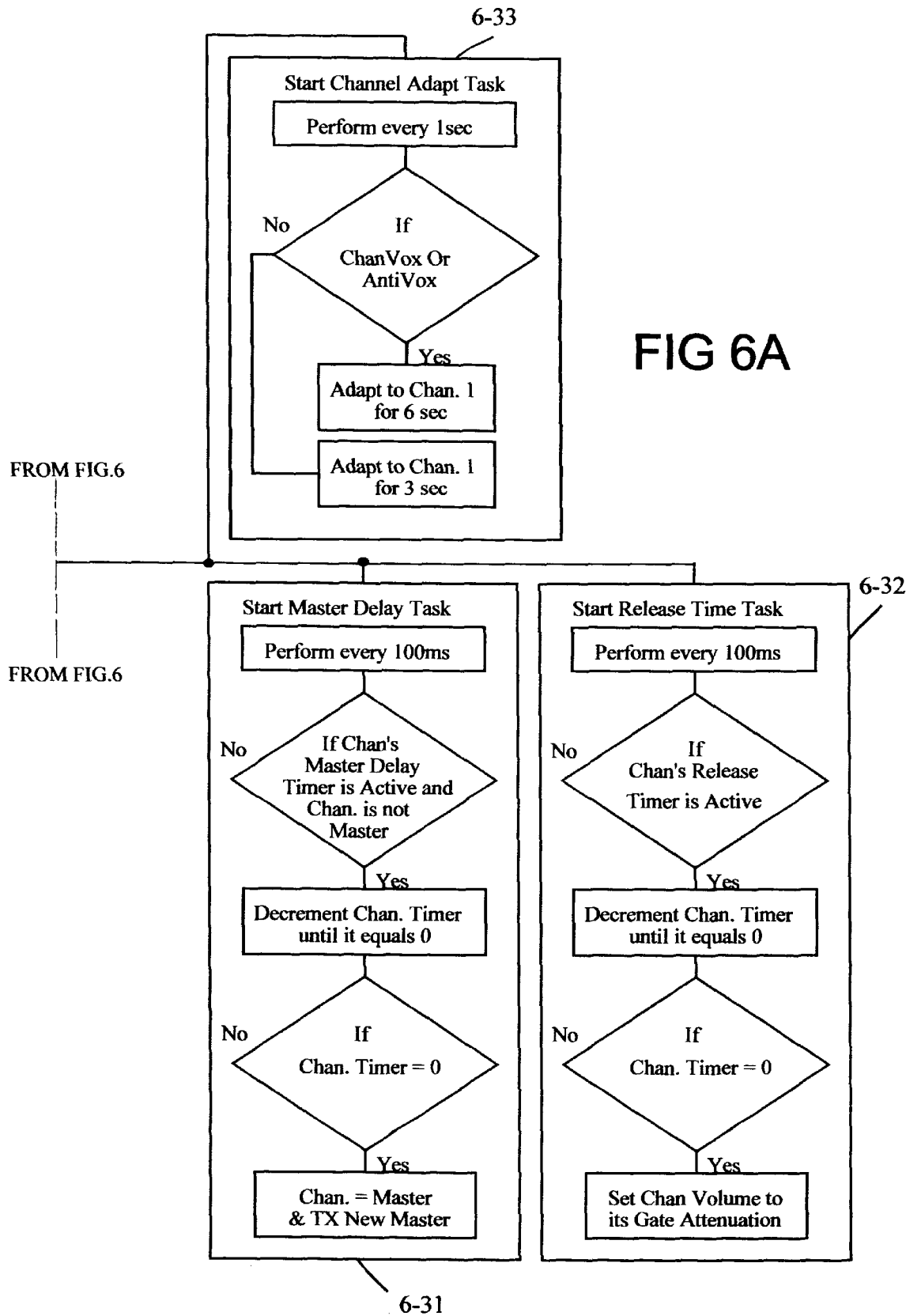

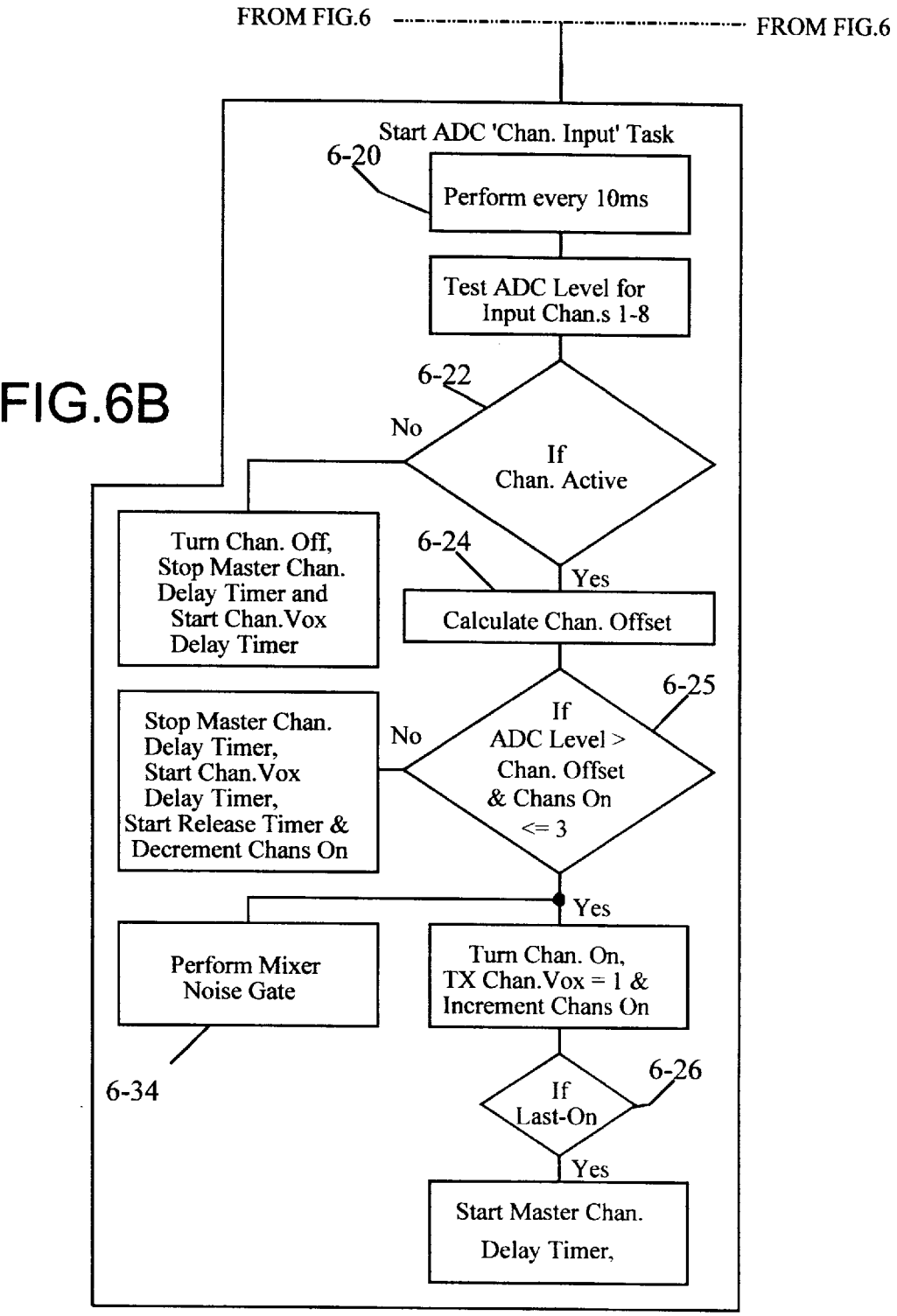

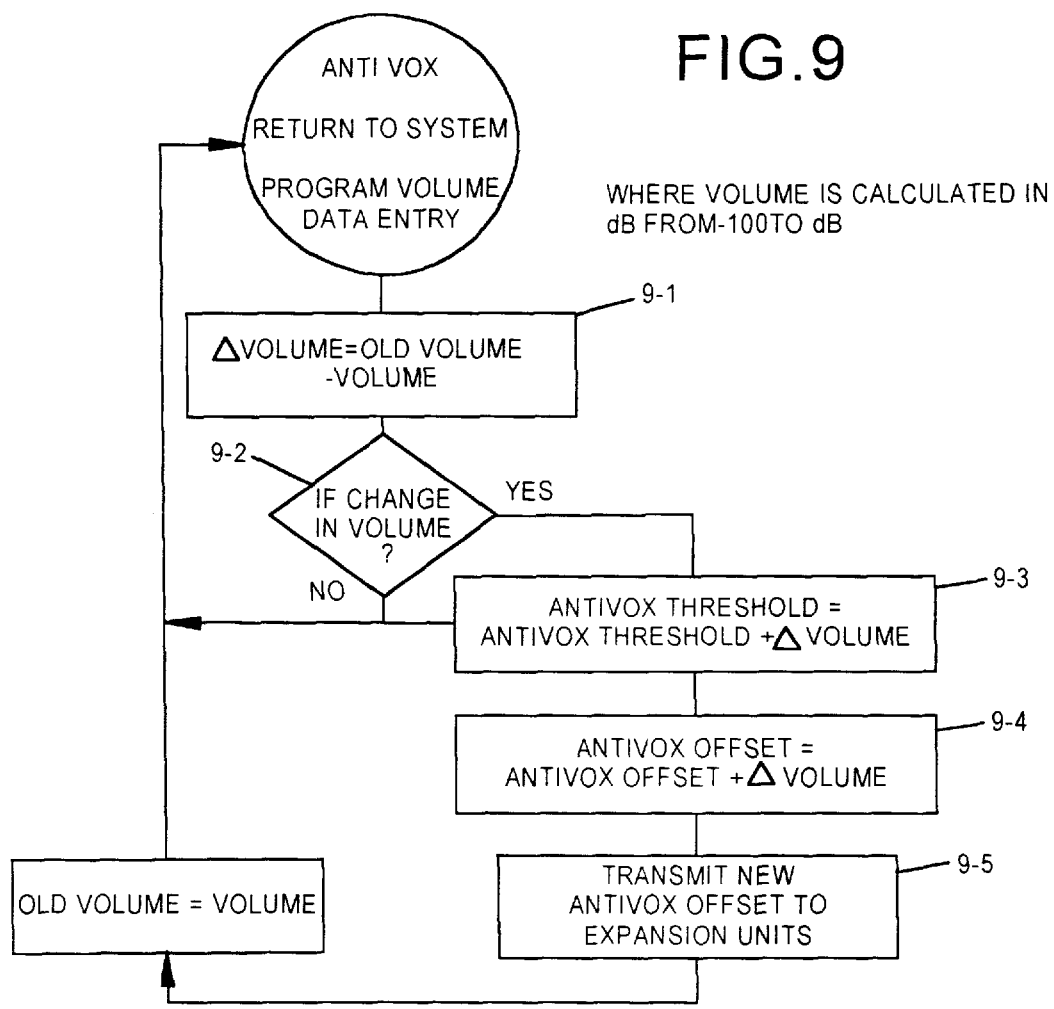

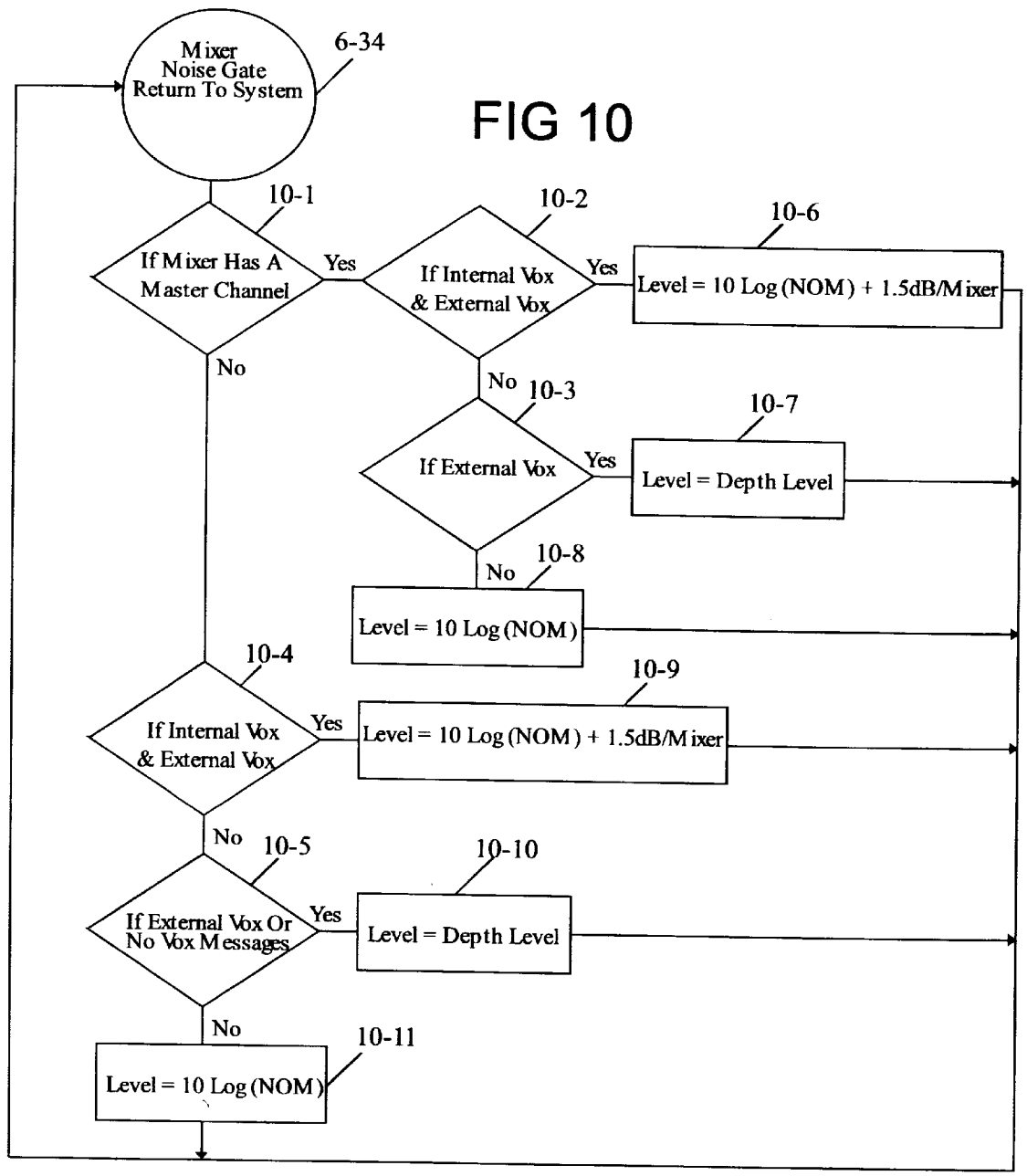

AUDIO SYSTEM FOR CONFERENCING/ PRESENTATION ROOM

BACKGROUND OF THE INVENTION

The present invention pertains in general to conference room audio systems, video conference room audio systems, and multi-location video conference systems. Mostly, the invention pertains to a microprocessor controlled conference room audio system including a multiple port selective audio bridge and expandible microphone mixer modules each with an adaptive acoustic echo canceller for full duplex, balanced audio operation between near-end and far-end locations.

Processing of multiple source audio signals, including the audio component of video teleconferencing, requires a system that can accommodate a variety of unique signal characteristics, including diverse signal levels. For example, in a multi-location video teleconferencing system each site may include the audio component of the video-audio signal, one or more incoming and outgoing telephone line voice signals, multiple microphone speech inputs which may be mixed in a voice activated mixer prior to being combined with the other audio sources, playback from an audio or VCR recorder as well as unspecified auxiliary audio inputs and outputs. The different levels, background noise, susceptibility of feedback and echo are some of the special source characteristics that must be dealt with both individually and in combination in order to properly process and channel the combined audio which is sometimes called the program audio.

In addition to video teleconferencing, other applications for such systems include engineered teleconferencing and distance learning. Engineered teleconferencing, once installed and set up, requires considerable automatic operation and a high level of reliability. The user has the expectation that the system will work well at all times. Video conferencing adds to engineered teleconferencing the dimension of real-time video. Usually "a video follows audio" is available in which status signals respond to changing audio sources to automatically pan cameras and/or switch video sources to display the current speaker or subject. Examples of such installations include corporate and governmental conferencing centers, criminal justice applications, and educational institutions. Distance learning is an application enjoying tremendous growth. Private and public institutions including health care organizations are making increasing use of the multi-site capability of teleconferencing systems.

While the need is growing and the applications are many, teleconferencing systems now available have certain disadvantages and shortcomings particularly in the area of integrating multiple audio sources and providing the desired status signals that, for example, automatically switch or direct video in "video follows audio". There are many suppliers of suitable equipment for the various source signals and related video switching equipment, but a significant need exists for a core system with expansion capability for integrating and channeling the various audio sources in a two-way (full duplex) operation.

Most conference room audio systems require an experienced technician with special audio test equipment to properly balance different levels of multiple source audio signals and synchronize the timing of the audio-video. Setup and alignment tests are costly and time consuming, and if not done properly can cause server audio problems especially in a multiple location (sometimes called multipoint) where audio levels must be the same for all participating locations in the conference. Also inherent in most video/audio conference systems is a round trip delay of about 0.5 second to as much as 4 seconds. The delay is produced by the processing time of video codecs and satellite systems. Because there is a delay in the video the audio also must be delayed in order to provide for lip-sync. Because of this delay any audio coupled between the far-end speaker and near-end microphone that is greater than around −40 dB will be heard as an echo. In order to eliminate the echo, past and present audio systems relied on suppression and well designed room acoustics. Since such prior systems did not provide for full duplex audio, users found it difficult to communicate. Current conference room audio systems are designed with acoustic echo cancellers that model the room's acoustic properties and use a convolution process that, when properly operating, electronically removes echo. Although these systems are an improvement over earlier techniques, they often do not function properly when six or more microphones are installed. The inability for current echo cancellers to perform optimally in large conference room environments (more than six microphones) forces system designers and installers to revert to older suppression type audio systems. Furthermore, many conventional room audio systems utilize contact closures to route audio. Such switched-contact control systems are limited in functionality, expandability and ease of interface to external devices.

Design techniques for large room audio systems are zoning and room combining. Zoning is utilized in large rooms to group and control microphones and speakers. Room combining is utilized to divide the audio system of a large room into several small rooms with their own audio system. Although these types of systems are common, they are very difficult to design, install and setup. Most systems are custom engineered to a conference room and prone to loss of alignment requiring frequent adjustment by a skilled audio engineer or technician.

Current video conference rooms that require connections to four or fewer locations, called multipoint video conferencing, are often over-engineered with inordinately expensive digital or analog controllers having eight more ports. A less cumbersome and more cost effective system is needed for multipoint conferencing.

With conference room audio and video becoming more popular and users demanding better performance from their audio system, there exists a need for an intelligent room audio controller that overcomes the above noted deficiencies of current systems.

SUMMARY OF THE INVENTION

The present invention disclosed and claimed within incorporates a method and apparatus for controlling the audio of a conference room. A multiport bridge controlled by the intelligence of a programmed microcontroller selectively channels audio from a plurality of input ports to a plurality of output ports including a room program output. Coupled to one of the bridge input ports is at least one gated microphone mixer, including multiple microphone channels and an acoustical echo canceller.

In the preferred embodiment, expandability is accommodated by a second, third or up to n microphone mixers each having a separate echo canceller for the associated microphone inputs. The channels of each microphone mixer are gated on and off by controlled attenuation. A channel that becomes active is gated on, non-attenuated, when speech is detected and a channel vox message is produced. Each microphone channel can be configured by programming to have either a last-on or gated type mode. In last-on operation, a channel can acquire a master status, thereby maintaining a non-attenuated level as long as it is the master channel. The master status is achieved when a channel is active for a period of time longer than the master channel delay timer. Once a channel acquires the master status, it becomes the new master and the old master channel relinquishes its master status. The old master channel is then attenuated by its set attenuation level after its channel release timer has expired. In gated operation, a channel can become active but cannot acquire a master status. A gated channel will always return to its set attenuation level after its channel release timer has expired. By attenuating non-active microphones the summation of microphones and room reflections are reduced, which allows for a large number of microphones to be utilized without degrading the audio quality.

The preferred embodiment of the intelligent room echo canceller is dynamically adaptive, which allows it to function in very large conference rooms. The adaptive feature of the acoustic echo canceller allows it to receive microphone status information from the room controller. The status information, which is the new current master microphone instructs the echo canceller to converge to its last known settings for this microphone. Since the echo canceller knows the convergence setting for each microphone, it will be able to converge and cancel the returned audio at a quicker rate then if it had to make a drastic convergence each time a new microphone channel became active. All convergence data are stored in nonvolatile memory.

Another aspect of the preferred embodiment is to provide a separate echo canceller for each mixer module, with all echo cancellers receiving the same reference from the combined output audio of the bridge. In this unique configuration, the intelligent echo canceller is responsible for adaptively canceling echos generated by only the limited number of microphones connected to that mixer so that in a large room installation having many microphones and associated acoustical paths, echo cancellation is not overtaxed.

The preferred embodiment has a base unit containing the selective audio bridge and a master microcontroller. The base unit bridge has six selective ports that allow for selective full duplex mixing of sources including a room microphone, far-end audio, telephone hybrid, VCR, auxiliary and test audio. Any bridge input can be connected to any other source output, but not to its own output. This constraint is a safeguard to avoid positive feedback. The foregoing features of the bridge enable the source integrator to function in various types of conferencing applications. Since the base unit and mixer module or modules are intelligent, they can adapt to almost any room audio design.

The preferred embodiment of the base unit has a user control port to connect directly to an external room controller. For example, as described herein a type of 232 port is used to receive external commands from the master microcontroller of the base unit and to send out port and microphone channel status messages, such as for "video follow audio" to the external room controller or other external applications.

The signal level at each input port of the base unit bridge and each input channel of the mixer module is monitored via an A/D input to the microcontrollers. Master (last-on) status of the mic channels and bridge input ports are determined. Such status is then available in the microcontrollers and broadcast over the user port of the master to external control systems. The bridge output levels are also A/D monitored by the master microcontroller and, in the preferred embodiment, an antivox message is generated to invoke prestored microphone channel threshold offsets for suppressing mic gating due to in-room loudspeaker audio.

BRIEF DESCRIPTION OF THE DRAWINGS

The foregoing and other features of the present invention will be more fully appreciated when considered in light of the following specification and drawings in which:

FIGS. 1, 1A, 1B, and 1C are collectively a representative diagram of an exemplary conferencing system incorporating the audio source integration components of the invention.

FIGS. 2, 2A, 2B, and 2C are collectively a detailed block diagram of one of the components of FIGS. 1–1C called the base unit that includes a selective audio bridge and programmed master microcontroller;

FIGS. 4, 4A and 4B are collectively a detailed block diagram of one of the microphone mixer modules of FIGS. 1–1C including a separate acoustic echo canceller and slave microcontroller;

FIGS. 6, 6A and 6B together illustrate a flowchart of the slave processor operation for each mixer module;

FIG. 9 illustrates a subroutine for recalculating an antivox threshold and antivox offset by the master processor of the base unit when the program volume is changed.

FIG. 10 illustrates a subroutine for calculating a mixer noise gate level by the slave processor in each mixer module.

DETAILED DESCRIPTION OF THE PREFERRED EMBODIMENT

Figure 1B:
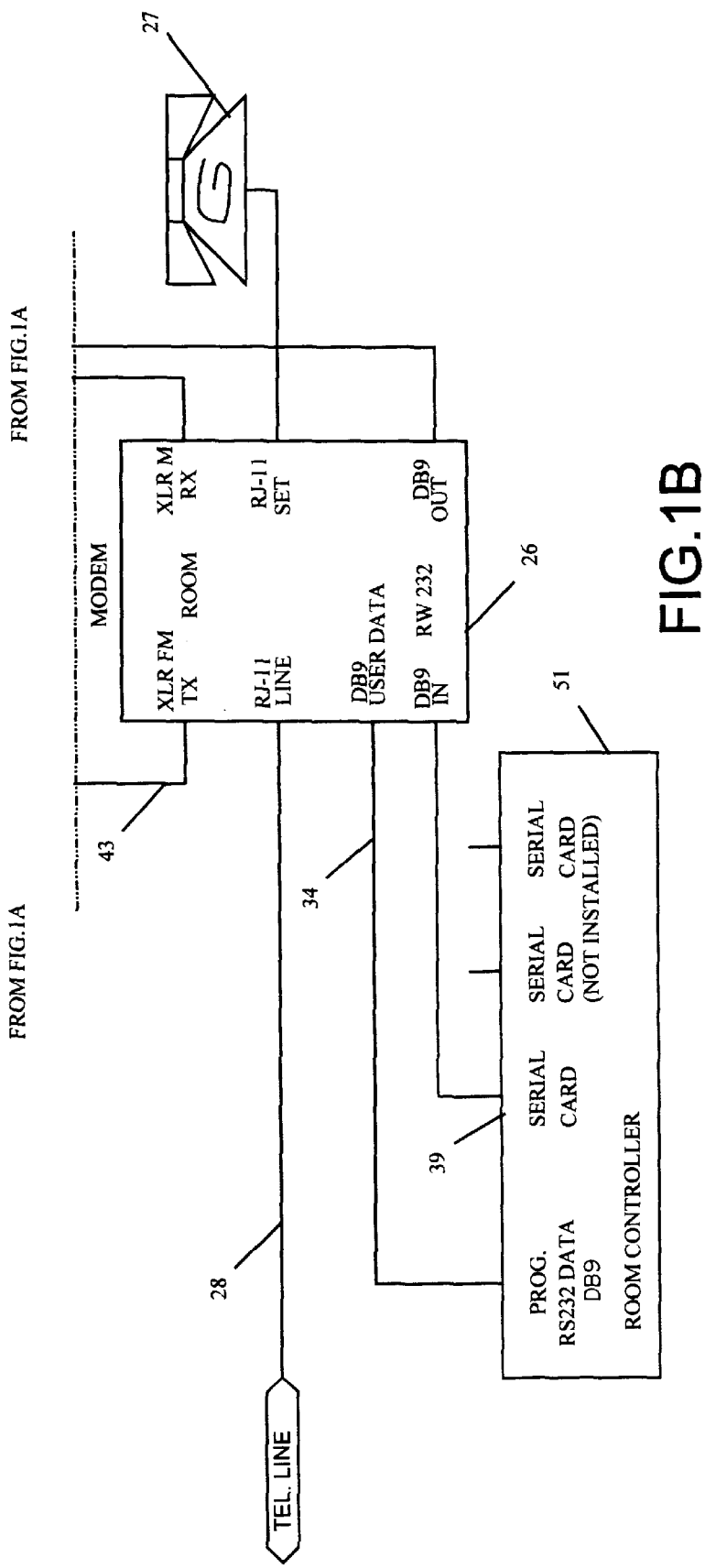
Figure 1C:
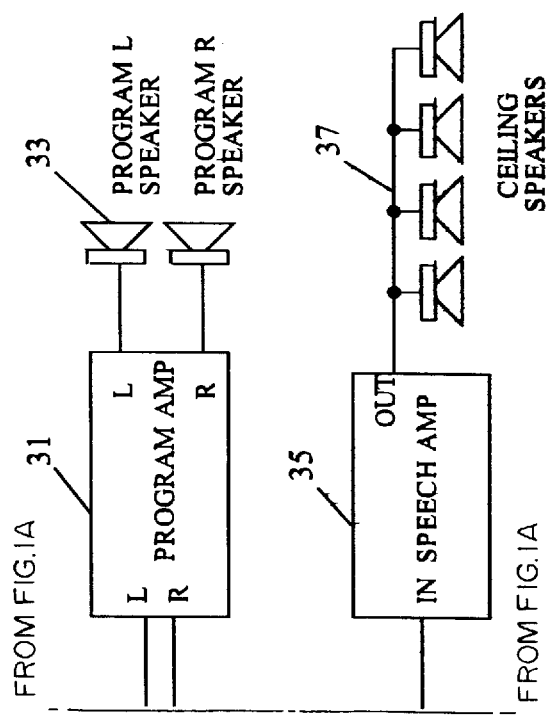

An exemplary conferencing system employing the source integration capabilities of the present invention is illustrated in FIG. 1 and includes a base unit 11 and a plurality of microphone mixer modules 13 and 15. Base unit 11 has a multiport audio bridge operating under the control of a master microcontroller processor to direct audio signal traffic into and out of the system installation with near-end to far-end and far-end to near-end full duplex operation. Although 1 to n=6 mixer modules are accommodated, here in the example, two mixers 13 and 15 are used, each having multiple microphone input channels 1–8 for the room microphones and a separate adaptive acoustic echo canceller. Speech or other sound picked up by the microphones produce audio signals that are threshold detected. When above adaptive thresholds, the signals are gated through and combined in the mixers and in turn combined again at mixer input port 1 of the base unit 11.

Base unit 11 and at least one of modular mixers 13 and 15 form the essential components of the integrator system of the invention. Related equipment includes audio signal sources being the above mentioned multiple microphones including a first set of eight microphones indicated at 17 for connection to mixer 13 and a second microphone set shown at 18 for mixer 15; a video/audio coding and decoding (CODEC) device 19; a first VCR 22 and a second VCR or auxiliary source 24; and a telephone modem 26 and handset 27. In this case modem 26 has both voice and data capability. Sources 19, 22, 24 and 26 are applied to different input ports 1–6 of the internal audio bridge of base unit 11 and are selectively combined and hence integrated with the audio from microphone mixers 13 and 15.

The resulting combined near-end audio is sent out to a far-end location by selectively bridging the various audio inputs to audio output ports 1 though 6 as shown. The construction and operation of the internal multiport audio bridge of base unit 11 is described more fully below but essentially selects different sets of input port audio and sends the combined sources to the output ports. Thus the output port 1 of base unit 11 is the combined program signal sent to an output program amplifier 31 which in turn drives program speakers 33. For example, input ports 2, 3, 4, 5, and 6 may be combined and sent to program output port 1 (but not input port 1 that has the mixed microphone audio as that would cause unwanted feedback).

Base unit 11 can be configured with an output port 3 of the audio bridge applying program audio, including an attenuated version of the mixed microphones to a near-end speech amplifier 35 that in turn drives room ceiling speakers 37 under controlled signal conditions that preclude unwanted feedback.

The mixed microphone audio goes out over connection 41 at CODEC audio output port 2 and out over port 6 to telephone modem 26 transmit (TX) via connection 43. Far-end CODEC audio is received and applied to input port 2 from device 19 and far-end telephone is available from the RX terminal of the room modem 26 and is applied via connection 44 to phone input port 6 of base unit 11. VCR 22 and the auxiliary source VCR 24 can be connected to record the audio program by connecting their respective recording inputs to the aux and VCR output ports 4 and 5 via connections 45 and 47 from base unit 11 as illustrated. The phone modem 26 also has a set terminal connected to a near-end telephone handset 27 and a line port connected to the incoming duplex telephone line 28.

As a feature of the preferred embodiment of the invention, the base unit 11 includes, as will be described below, a master processor provided by a preprogrammed and user programmable microcontroller. Each of mixer modules 13 and 15 have separate slave processors, also being programmable microcontrollers, that are user configured via the master processor of the base unit 11. Base unit 11 accepts user programmable data from an external source such as a room controller 51. To set up the installation and apply the initial user programming to base unit 11, room controller 51 may be replaced with or augmented by a general purpose computer having an installation application program including a menu driven installation sequence. This allows the audio engineer to configure base unit 11. Slave microprocessors within mic mixers 13 and 15 also receive the initial configuration parameters for the installation from the set-up computer but via the master processor. Thereafter, the set-up computer can be removed and, if desired, a room controller 51 may direct operation. Such room controllers are known per se for teleconferencing systems, and are commercially available from AMX and other suppliers. For example, room controller 51 may be at a near-end location and linked by data lines not shown to an identical or similar far-end controller for coordinating the audio integration at each site and directing video traffic. In this context, the remote or far-end site may be equipped with an identical or similar audio integrator system such as illustrated here by base unit 11 and mixers 13 and 15, or it may be as simple a system as a phone and associated phone line, or video camera/microphone and video CODEC, or any of a wide variety of other, different video and/or audio far-end installations.

Modem 26 is of the hybrid type including both audio and data transmission. The modem will support separate or simultaneous audio and data transmissions. During separate transmissions, audio is directly sent over the telephone line using a four wire to two wire telephone line interface and a line echo canceller. The line echo canceller is used to remove telephone line echo produced by the four wire to two wire conversion.

The audio inputs and outputs are balanced. During simultaneous transmission, the audio is digitally compressed and requires a similar commercially available modem at the far-end. During separate transmission, the audio is directly sent over the telephone lines through the internal line echo canceller.

Base Unit 11

Figure 2A:
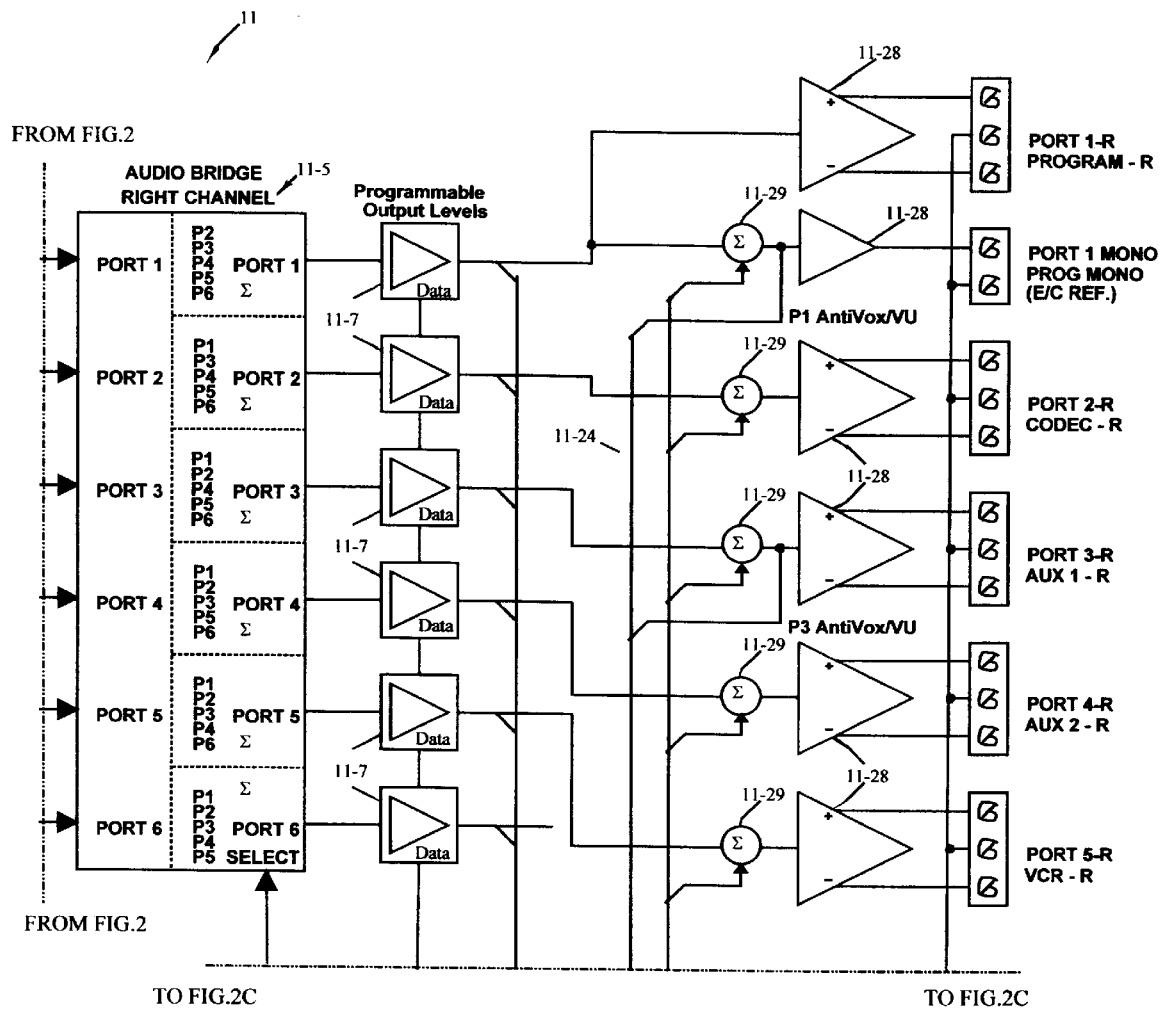
Figure 2B:
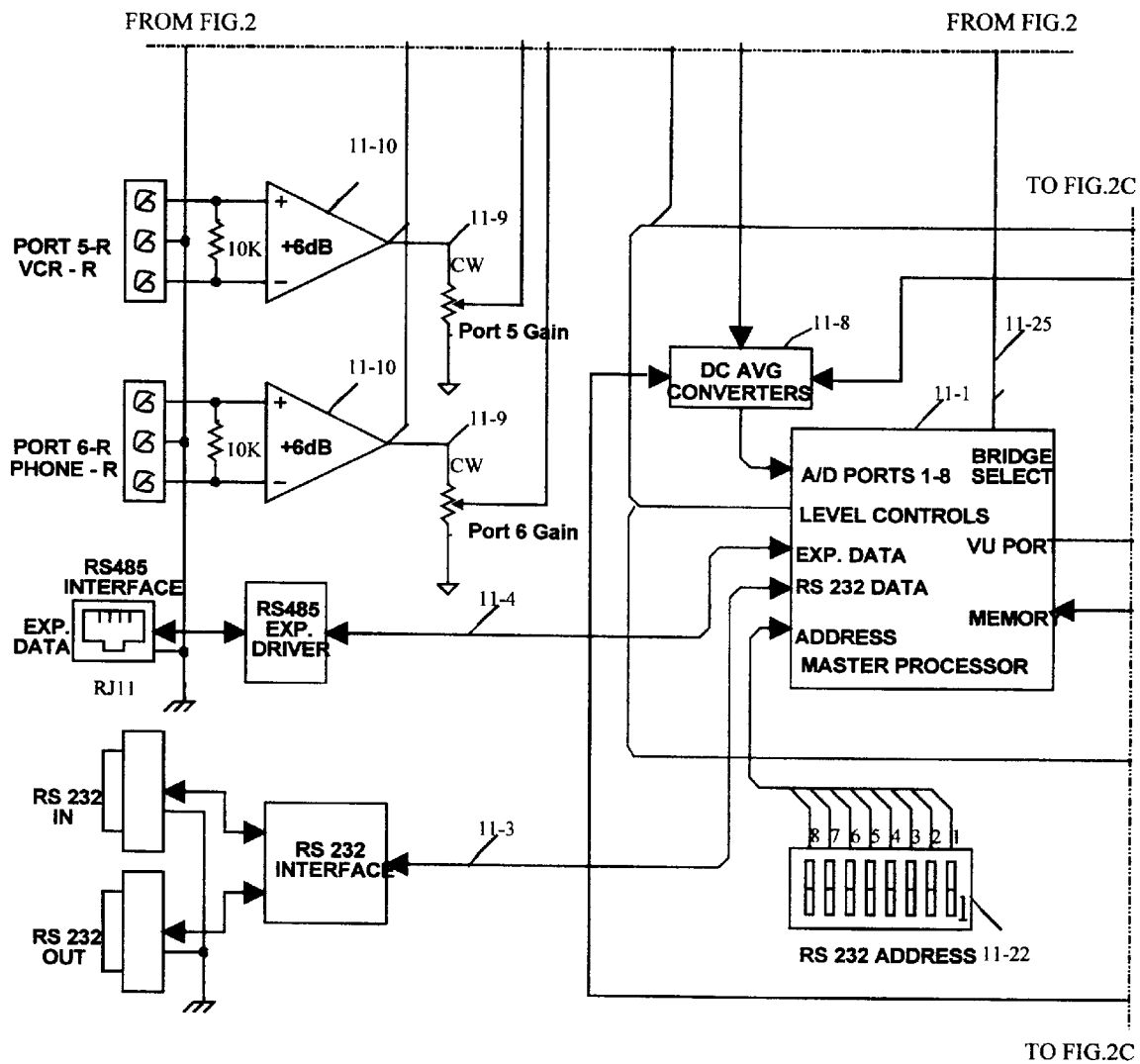
Figure 2C:
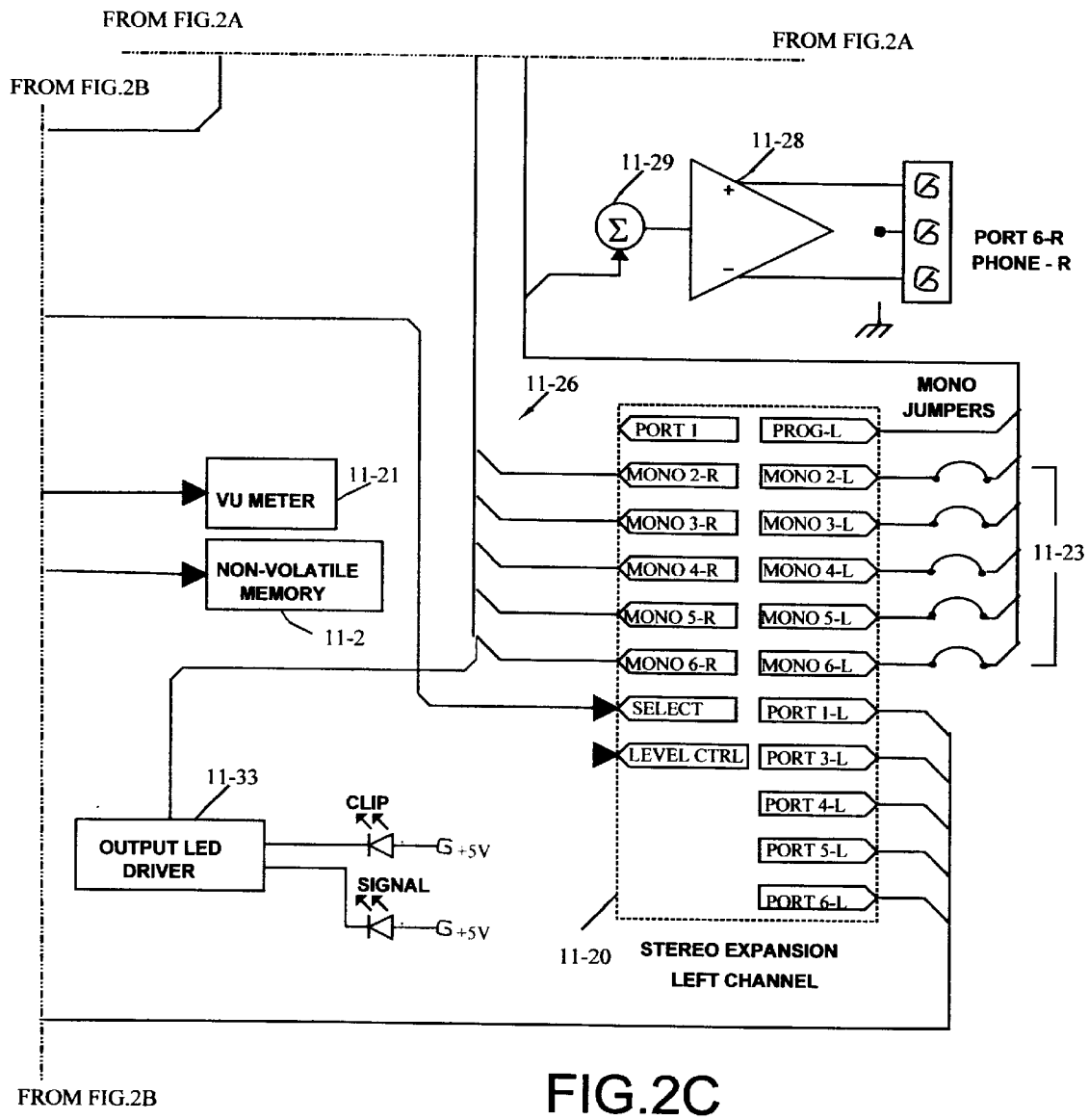

The base unit 11 as shown in FIG. 2 is the master controller of the audio bridge and mic mixer integration. All operating parameters of the system are performed and stored in the base unit using non-volatile memory. System communications between the base unit 11 and the mixer modules 13 and 15 are performed through an expansion data interface based on an RS 485 serial data link. User data communications between base unit 11 and room controller 51 are performed using a version of an RS 232 serial data bus. This communication bus uses standard RS 232 protocol with an 8 bit device addressing technique 11–22 that allows it to be daisy chained to other RS 232 type products.

The base unit consists of:

master processor 11-1 for control, audio monitoring and communications;

system parameters stored in non-volatile memory 11-2;

an RS 232 type of user control port 11-3;

expansion data interface 11-4;

six port selective audio bridge 11-5 controlled through the Bridge Select 11-25;

programmable level control 11-6 and 11-7 on all inputs and outputs respectively of the audio bridge;

DC averaging converters 11-8 for A/D monitoring of each input of the audio bridge 11-5 and the outputs of Port 1 and Port 3 11–24;

balanced input amplifiers 11-10 at ports 2–6, and a six channel summation mixer 11–27 at port 1 for the multiple microphone expansion mixers;

hardware level trim controls 11-9 to set overall input level on each port except input port 1;

six input channels EXP 1-6 on input port 1 to accommodate six expansion modules and an input mixer 11-27 therefor;

output balanced amplifiers 11-28 and a mono reference amplifier 11-28';

stereo expansion 11-20 of the audio bridge with mono output jumper selectors 11-23 and summing modes 11-29;

LED VU meter 11-21, input and output LED drivers 11-31 and 11-33;

External power supply (not shown).

There are six ports on the audio bridge 11-5 with each port consisting of a digitally selected five input audio mixer. The selection is made at 11-24 by master processor 11-1. This type of configuration does not allow for connection of an input to its output, thereby not allowing for a possible loop back condition that could result in feedback.

Each input is monitored by the processor allowing for both digital limiting and speech detection. Determining if audio is present at a port is performed using speech detection which produces both a port vox on and master port message. Once a port vox on message is generated, an offset is produced to increase the thresholds of the other ports, thereby making it more difficult for the audio detection on the other ports. This offset is set by the vox offset level.

Unlike a mixer channel input, which gates on by voice detection, a port input can only operate manually.

A "port vox on" message is produced when:
1. A port is set to on and its vox type mode is set to auto.
2. Audio is detected over the set threshold level on any port described in 1.

OR
1. A port is set to on and its vox type mode is set to manual.
2. The described port's force vox is set to vox on.

A "master port" message is produced when a port vox is on longer than the set time of the master port delay timer. After speech is no longer detected, a port vox off message is produced and the port vox release timer is initiated.

The status information of port vox and master port messages can be used by the room controller for video switching of a multipoint videoconference.

Port 1 is different from all other ports since it is designed as the room port. The input of port 1 has a six channel mixer 11-27 to which the expansion mixer modules are connected. The output of port 1 is designed to connect to the program room speakers and the echo canceller input reference of the expansion mixers, therefore there are two outputs; a standard balanced and a mono output. The mono output of port 1 is required as a reference signal for the echo cancellers in the expansion mixers and must be connected to all expansion mixers. To eliminate the possible gating on of microphones when there is audio present at the room speakers, the output speech detectors of ports 1 and 3 are configurable as increased offset to the threshold levels of the microphone channels. This method of increased offsets is called antivox. Any audio signal on the outputs of port 1 or port 3 that is greater than the set antivox threshold level generates an antivox message that the base unit broadcasts to the expansion units. The expansion mixers use this message as an offset to the microphone thresholds.

The base unit 11 determines when the audio level going to the room loudspeakers is at such a high volume that unwanted microphone gating at the mixer modules 13 and 15 may occur. To counteract this effect, an antivox control message is produced to cause an increase in the required microphone gating thresholds. This antivox message is produced when the audio level at the room speakers (as it appears at output port 1 and program selectable port 3) rises above a set antivox threshold. When an antivox message is received by the mixers, a programmable antivox offset threshold is added to all microphone input channels. The base unit initially broadcasts predetermined offset values to all expansion mixer modules during power-up and whenever the output volume levels of output ports 1 or 3 are changed. When the output volume is changed, the antivox threshold and the antivox offset level are recalculated by a master processor subroutine shown in FIG. 9. The revised antivox offset level is then broadcast to the mixer modules 13 and 15. A greater speaker volume requires an increase in the detected antivox threshold and an increase in the channel offsets to reduce the sensitivity of the antivox and microphone speech detectors. By storing a predetermined antivox offset level in the expansion mixer modules, and only broadcasting the antivox on/off message when output audio is detected at the room loudspeaker, the speed and performance of the system is enhanced.

The stereo expansion module 11-20 is a plug-in card for the base unit. By adding a stereo expansion card to the base unit, the inputs and outputs of the bridge can perform stereo audio. In some installations there might be both mono and stereo equipment. Both mono and stereo equipment are accommodated by adding mono mix jumper selectors 11-23 on the output ports. Since port 1 is the program output, it does not have a mono jumper. Included with this module is a copy of the base unit's six port audio bridge with the exception that port 1's has no input connection comes from the base on line 11-26 and there is no mono program output. Since the stereo module is mounted on top, it is designated as the left channel.

The stereo expansion module 11-20 includes:

six port selective audio bridge (like bridge 11-5) that is combined with the base unit's principal audio bridge 11-5 hardware level trim control (like controls 11-9) to set overall input level on each port except port 1 digital level controls (corresponding to 11-6 and 11-7) on all inputs and outputs combined with the base unit's level controls port 1's input provided on line 11-26 from the right channel of the base unit mono output jumper selectors 11-23

Figure 3:
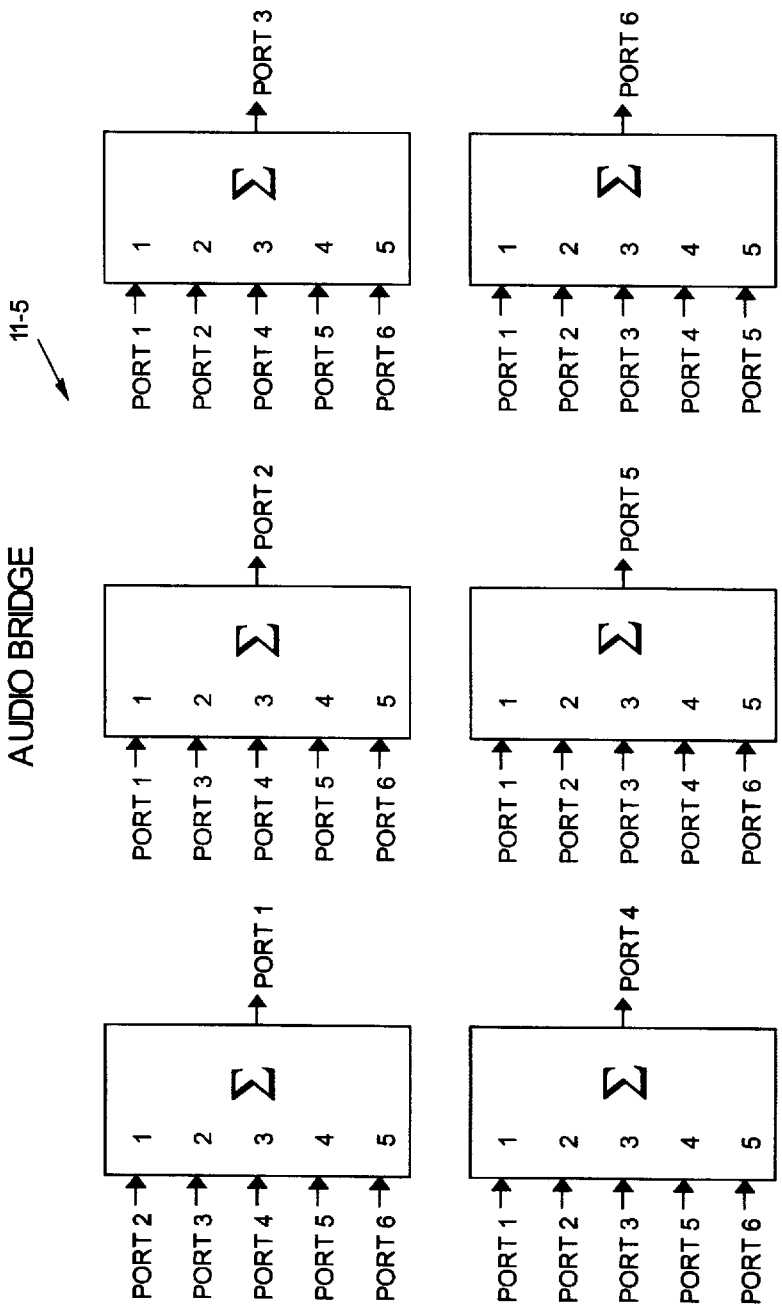
FIG. 3 illustrates a diagram of the six input to six output port combinations of the audio bridge selectable by the master microcontroller.

The possible combinations of bridge input ports 1-6 selectable by the microcontroller for coupling to an output port 1-6 are illustrated by the chart in FIG. 3.

Microphone Mixer

Each mixer module, such as the illustrated modules 13 and 15, incorporate a digitally controlled analog eight channel microphone/line input auto mixer with an optional adaptive acoustic echo canceller. The base unit supports up to 6 mixer modules, as shown in FIGS. 1 and 2, allowing for up to 48 inputs. The mixer modules 13, 15—n function only in combination with base unit 11 using the expansion data interface connection RS 485.

As shown in FIG. 4, each mixer (mixer 13 is shown as an example) has:

an address selectable 13-22 slave processor 13-1 for control, audio monitoring and communications eight channel microphone/line auto mixer 13-2 programmable input gate attenuators 13-3 programmable output noise gate attenuator 13-5

7 KHz acoustic echo canceller 13-7 expansion mixer summation port 13-8 for daisy chaining mixers pre-gate aux output 13-10 and associated pre-gate mixer 13-11 echo canceller bypass 13-6 expansion control port 13-12 mix output 13-18 post gate outputs 13-14 for each channel phantom microphone power selection circuit 13-15 for each channel manual gain select switch and balanced amplifier circuit 13-17 for each channel fixed gain amplifier and manual trim circuit 13-19 for each channel input and output LED drivers 13-25 and status LEDs 13-27 external power supply (not shown)

To reduce acoustical gain, each mixer 13, 15 only allows a maximum of three microphone channels to be gated on at the same time. When using multiple mixers, several microphones can gate on at the same time. If a single echo canceller is modeling all mixers, and more than three microphones are on at the same time, the acoustical model for the echo canceller may be too complex, causing the echo canceller to diverge. This divergence of the echo canceller may cause it to operate with more suppression or return echo. To eliminate this problem, each mixer accommodates an additional acoustic echo canceller. Placing an echo canceller such as 13-7 in each mixer reduces the number of acoustical echo paths for a multi-microphone system, thereby improving the audio quality of the system.

When using multiple echo cancellers, one of the microphone channels on each mixer must be configured with its gate attenuation set to 0 db, no loss. Also, the program mono output port 1 from base unit 11 must be connected to all of the program reference inputs 13-16 of the mixers. This configuration allows the echo cancellers to adapt.

Each input channel of each mixer module 13 and 15 is monitored by the slave processor 13-1 allowing for speech detection. Determining if audio is present at a channel is accomplished in a speech detector implemented in software responsive to DC AVG converters 13-4. When speech (or other sound) is detected at an input channel, the mixer sends a speech-on message to the base unit 11 via port 13-12. The base unit 11 then produces a channel vox on message which commands an increase of the thresholds on all other channels by the amount of the predetermined vox offset level, thereby reducing the gating sensitivity of near microphones.

More particularly a "speech-on" message is produced at the mixer when:

1. An input channel is set to active and placed in a voice detection mode.
2. Less than the maximum allowed 4 channels are on.
3. The detected channel level is greater than the channel offset level.

A "master" channel message is produced when:

1. A channel is set to active, placed in a voice detection mode and set to "last-on".
2. Audio on that channel is detected over the channel offset level.
3. Audio is present on that channel longer than the time of the master channel delay timer.

After speech is no longer detected, the expansion mixer 13 slave processor 13-1 sends a speech-off message to the base unit 11 to start the channel vox release timer in the master processor 11-1. Once the release timer expires, the base unit 11 broadcasts a channel vox off message. The channel's gate does not release until the channel release timer expires.

Unlike other auto-mixers, each mixer channel is programmable as either a "last-on" or "gated" type output. Only a channel placed in a last-on condition can become the master channel. Each mixer slave processor only allows 3 channels to be gated on at the same time. This feature reduces the loop gain and the chance for feedback.

More particularly, a programmable adjustable depth control is incorporated as a special function noise gate 13-5 at the mix output 13-18 of each expansion mixer.

The expansion mixer noise gate has two operational modes:

1. Mixer "last-on"
2. "Gated"

To improve the speed and performance of the output noise gate 13-5, the control 13-20 for this gate is linked to the input gates via slave processor 13-1, thereby removing the need for an ouput gating threshold. If any channel on a mixer is a master channel (described herein), the output noise gate 13-5 is set to last-on operation. In last-on operation, the output noise gate 13-5 remains on until an input channel on a separate mixer becomes the master. The attenuation level of output noise gate 13-5 is regulated by the slave processor subroutine of FIG. 10 as described below in conjunction with the mixer slave program of FIG. 6.

Master Processor of Base Unit 11

Figure 5:
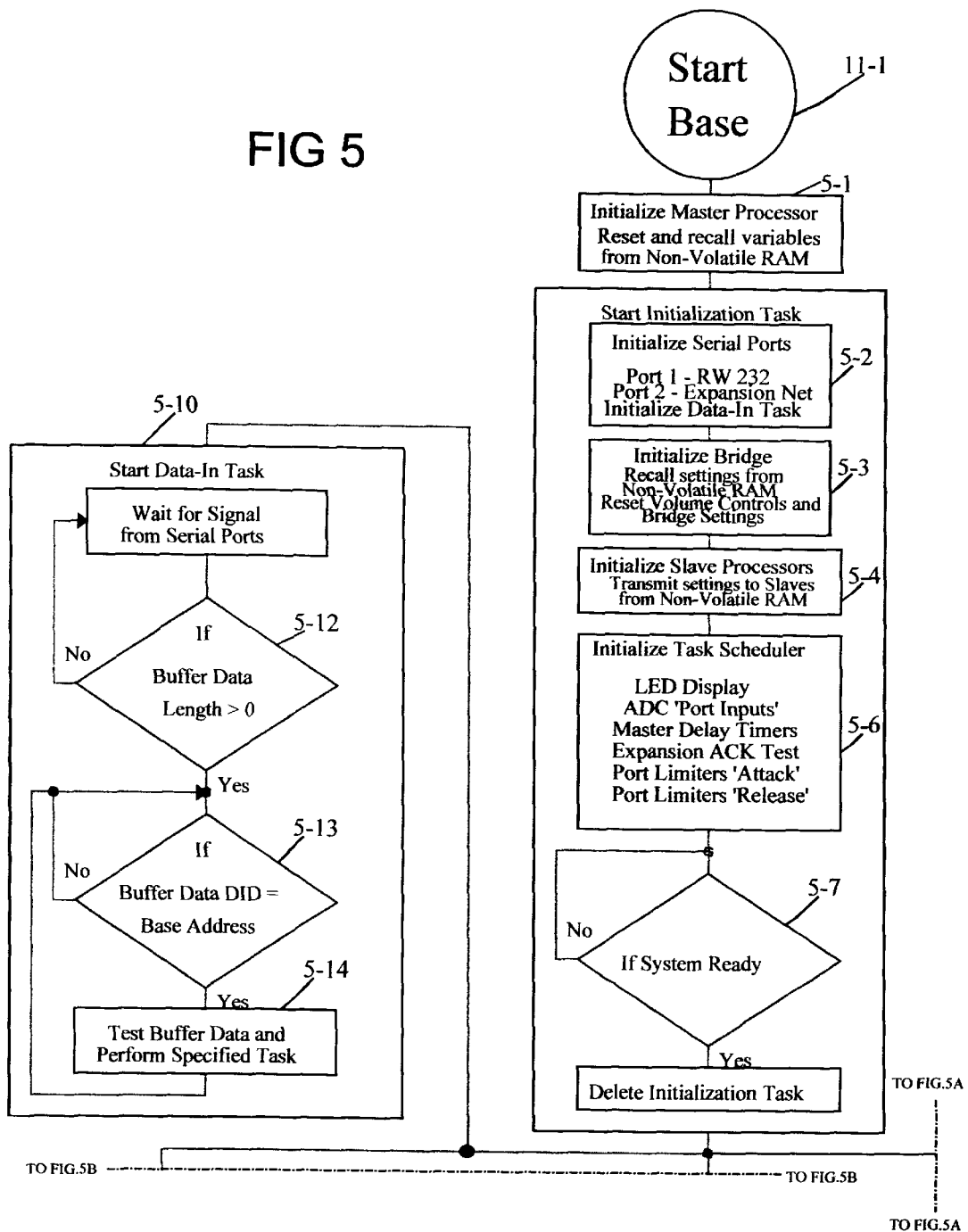
FIGS. 5, 5A and 5B together illustrate a flowchart of the master processor operation of the base unit master microcontroller.
Figure 5A:
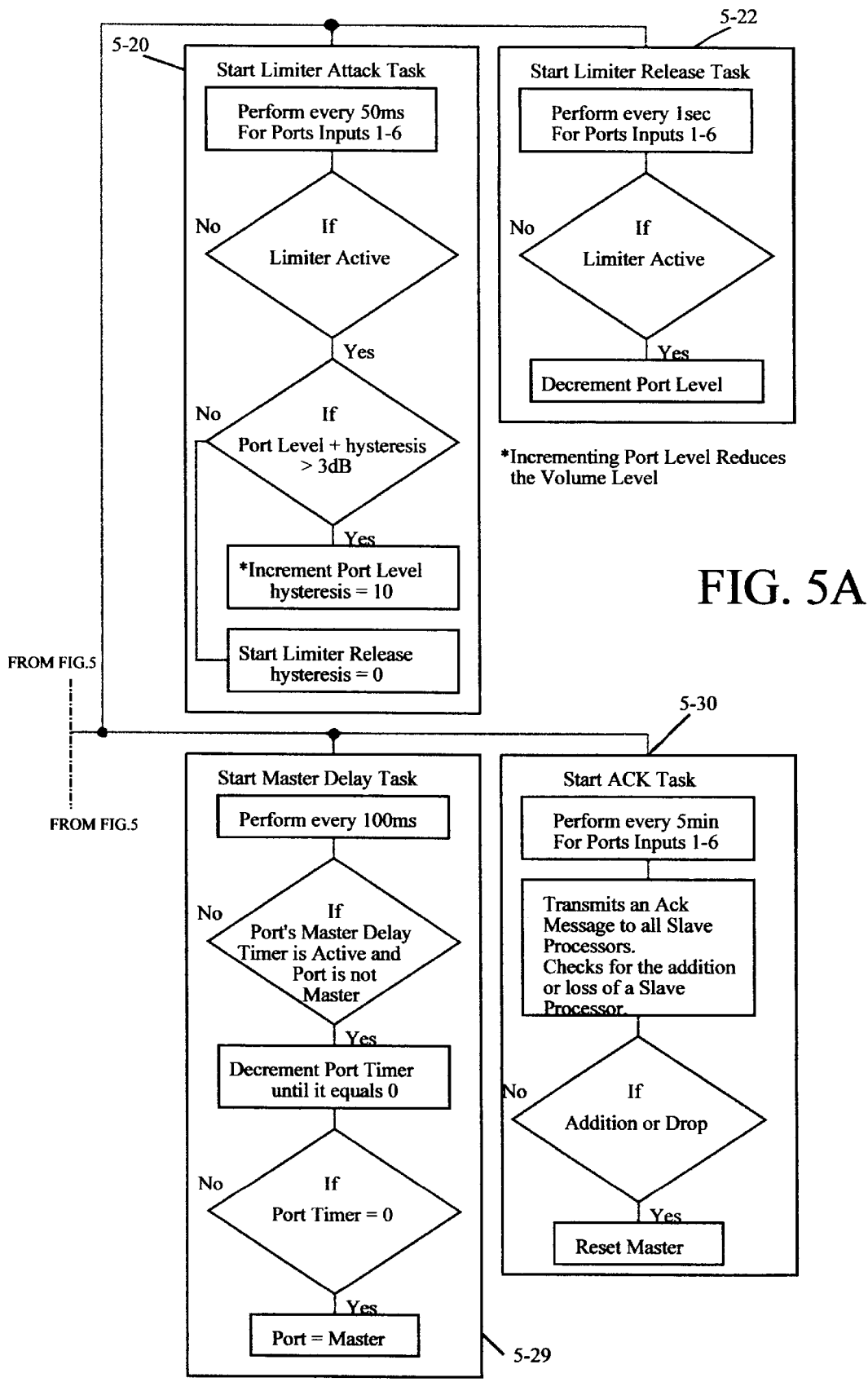
Figure 5B:
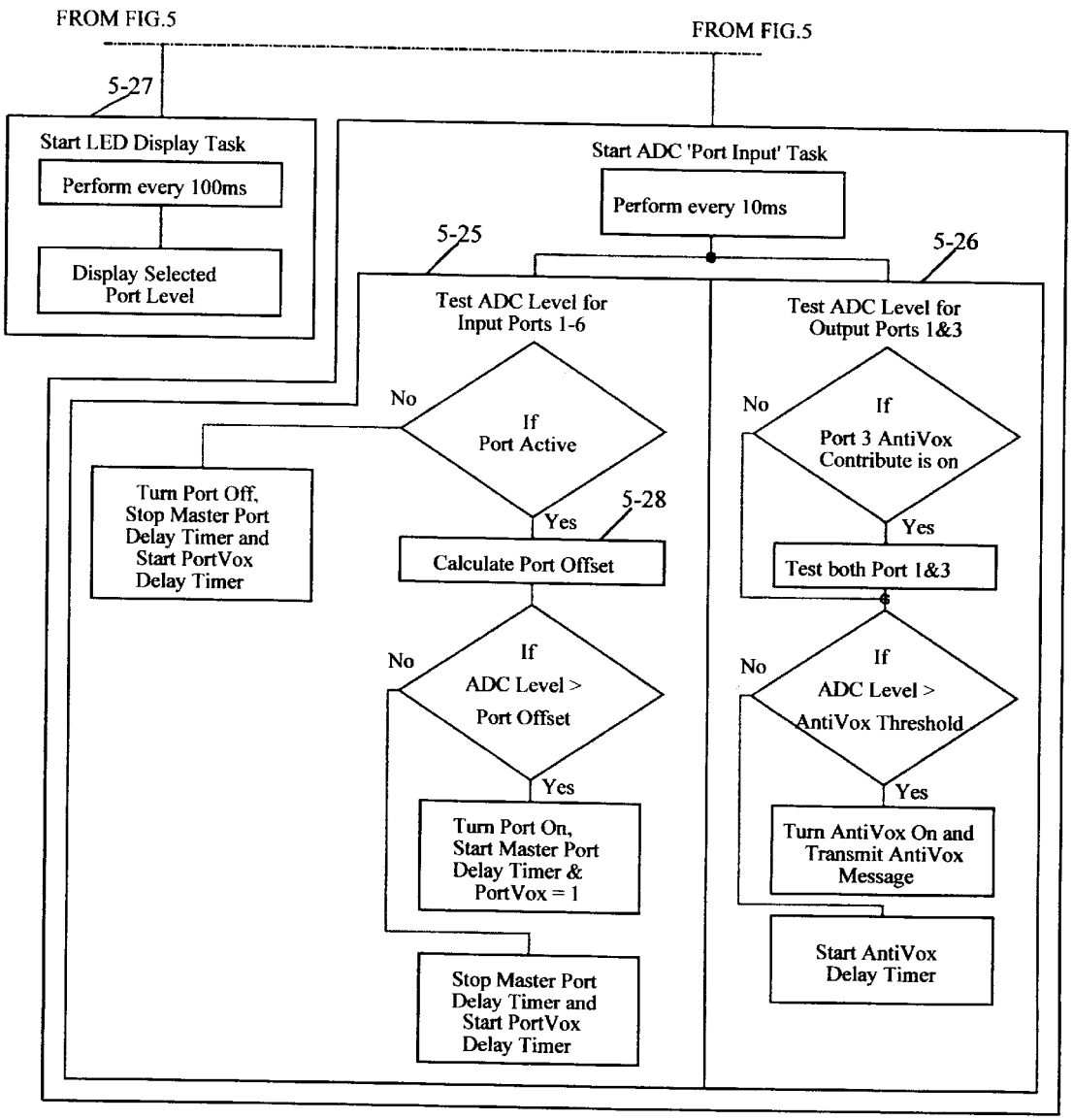

Master processor 11-1 of the base unit 11 shown in FIG. 2 may be a commercially available microcontroller or microprocessor programmed in accordance with the flow diagram shown in FIG. 5. As shown in FIG. 5, the programming for master processor 11-1 includes the following routines or tasks. The base unit is started by initializing the master processor as indicated at 5-1 which in turn commands a series of initialization routines under the category "Start Initialization Task" including initialization of serial ports 5-2, bridge 5-3, slave processors in the mixer modules at 5-4, task scheduler at 5-6, and is concluded by a decision check at 5-7 asking "If System Ready". A "Start Data-In Task" indicated at 5-10 receives and interprets user tasks commanded through the serial port including a buffer data length and buffer data DID=base address decision blocks 5-12 and 5-13 and a command block 5-14 for acting on the specified task. Start limiter attack task routine at 5-20 and start limiter release task 5-22 control an active limiter function of the base unit in order to maintain proper input audio levels. The routines for testing the level of input ports 1-6 and the level of output ports 1 and 3 are indicated at 5-25 and 5-26, respectively. The input port test routine calculates port offset 5-28 and turns port on, starts master port, starts delay timer, and sets the port vox flag=1, and if the level falls below the port offset then a command block stops the master port delay timer and starts port vox delay timer. The routine 5-26 that tests the output ports 1 and 3 implements the antivox function by looking for output level greater than antivox threshold, and if so, turning on the antivox flag and transmitting the corresponding message to the slave processors of the mixer modules. If the level falls below the antivox threshold, the antivox delay timer is started. Additionally, there are housekeeping routines including a routine 5-27 for controlling the LED display, routine 5-29 for determining the master port, and a routine 5-30 for keeping track of the number of slave processors actively operating with the base master processor.

Figure 7:
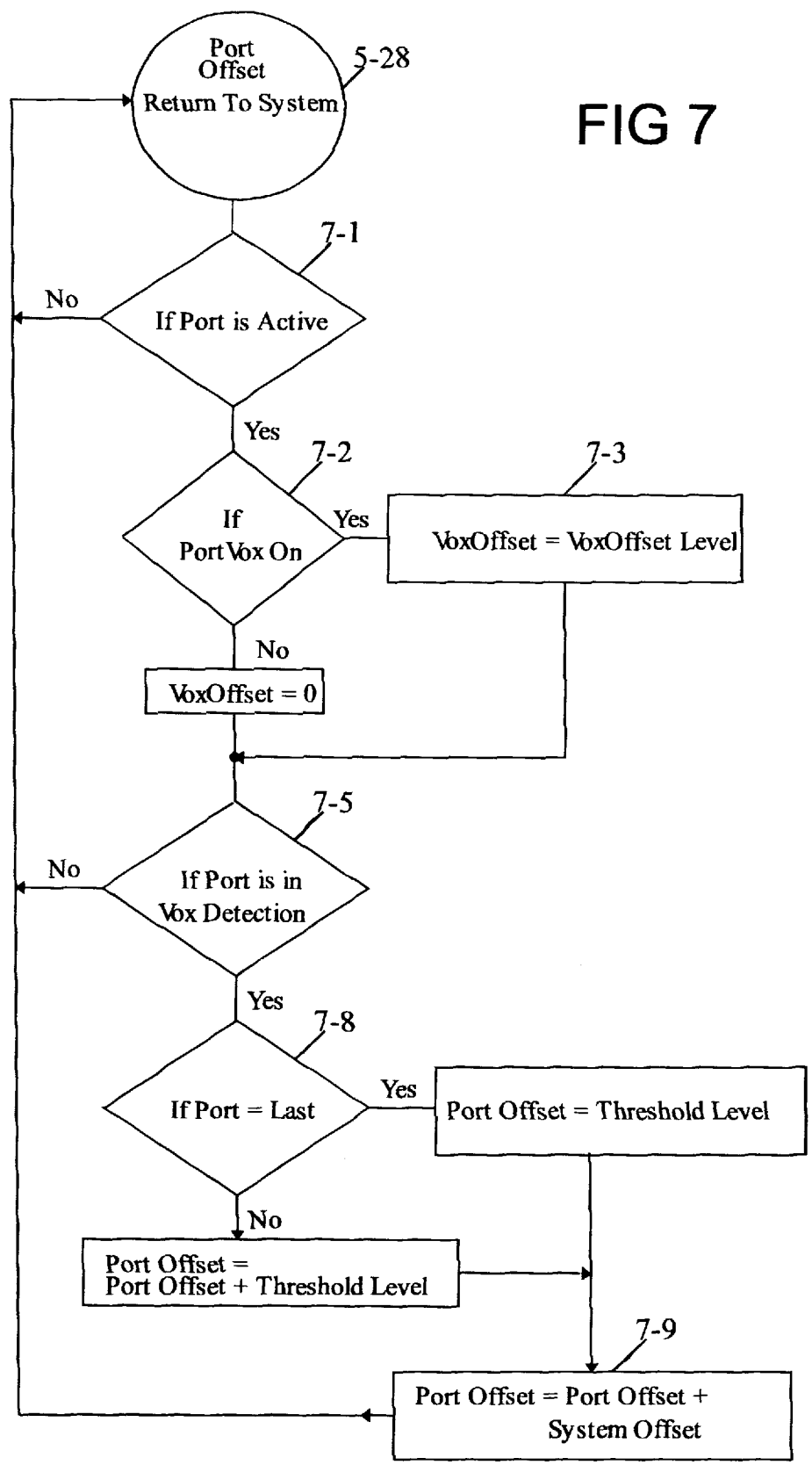
FIG. 7 illustrates a subroutine of the master processor for effecting port offset when bridge input ports are active and in vox detection.

As part of the programming of master processor 5-1, a routine for computing the port offset 5-28 is separately shown in FIG. 7. In this routine, the master processor checks to determine if the port is active at 7-1 and whether the port vox is on at 7-2 and if so, setting the vox offset to the vox offset level at 7-3. Then a decision is made if the port is in vox detection at 7-5, and if so, whether the port was the last port to produce a port vox message at 7-8 which in turn determines the value of the port offset to which a system offset is added at 7-9 and the programming flow returns to system.

Slave Processor Programming

Figure 6:
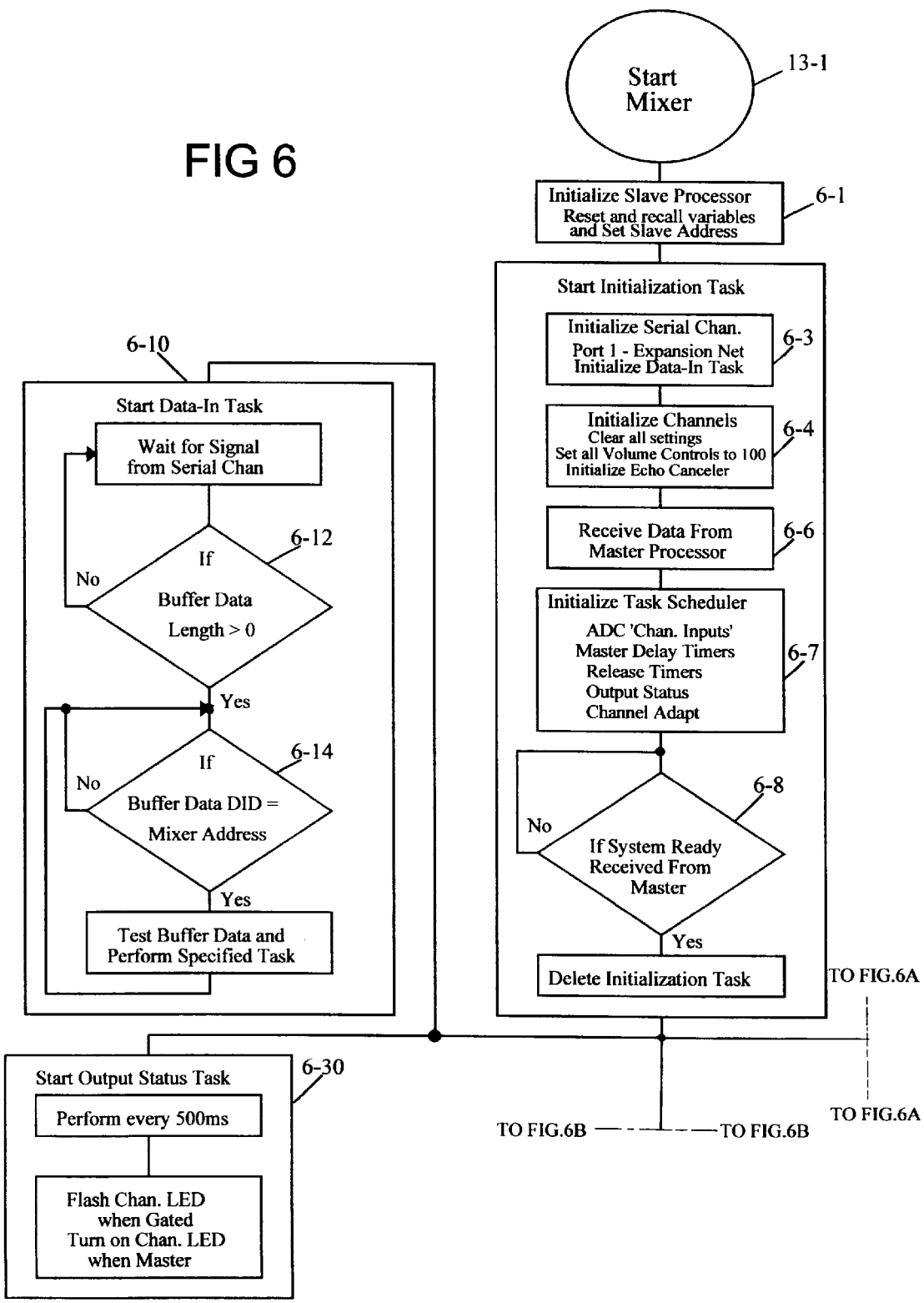

With reference to FIG. 6, the slave processor 13-1 is programmed to include a series of initialization tasks starting at 6-1 for initializing the expansion network and data-in task at 6-3, channels at 6-4; receive data at 6-6, and initializing task scheduler at 6-7. After these initializations, the program checks at 6-8 for a system ready received from the master processor.

The start data-in task routine at 6-10 includes buffer data length and address decision blocks 6-12 and 6-13 for receiving, interpreting and acting on commands or tasks received from the master processor over the base to mixer serial data port RS 485 network.

A level test routine indicated at 6-20 is performed at stated intervals to check the level at input channels 1-8 of the associated (internal) mixer module to determine in decision block 6-22 whether a channel is active, and if so, calculates the channel offset at 6-24 and then determines whether the level at the subject channel is greater than the channel offset and whether less than three channels are on at 6-25. If so, and if the channel is set to last on 6-26, the master channel delay timer is started, the TX channel vox flag is set to 1, and the channel on counter is incremented. If the decision at 6-25 is no, then the master channel delay timer is stopped, the channel vox delay timer is started, and the release timer is started and the channel on counter decremented. Timer control routines indicated at 6-31 and 6-32 operate the master delay timer and channel release timer functions. An LED flashing routine at 6-30 causes a channel LED to flash when that channel is gated on and turns on a steady LED indication when that channel has a master status.

Routine 6-33 calculates the average noise level for input channel 1 once every second. If either channel vox or antivox is on, the average level is calculated for 6 seconds; otherwise the average level is calculated for 3 seconds. The calculated noise level is used for the auto threshold level 8-12 in FIG. 8.

Operation and User Programming

The combination of base unit 11 and one or more mixer modules such as modules 13 and 15 serve to integrate the diverse sources of audio and provide full duplex routing of near-end and far-end sources in a system that can be configured and aligned using a few number of user programmer inputs. Thereafter the system will operate reliably without the need for frequent adjustment and on-hands control by a skilled engineer. The following is the review of certain of the unique and important operating features of the system.

Port Vox

This is a name given to a message or flag generated by the master controller of the base unit whenever any one or more of the input ports of the audio bridge have an input signal greater than a predetermined threshold. Normally that threshold will be set just above the noise level so that any activity at any of the input ports of the audio bridge will trigger the port vox condition. The port vox condition is a status only message (no gating occurs). It is produced by looking at the A-to-D converted port input signal level at the master processor of the base unit, developing a port vox message that can be requested by the room controller 51 via the RS 232 type connection 38 and 39.

Master Port

If a port vox status exists at one of the input ports for a time longer than the chosen (set) master port delay time, that port becomes a master port, and a message indicating the status of the master port can be requested by the room controller 51 via the RS 232 type connection 38 and 39. The chosen delay time to achieve master port status may be, for example, 500 ms. For example, assume that audio is received at the CODEC input port 2 of the audio bridge 11-5 indicating an audio signal is being produced at another location of a multipoint conference. When such CODEC input port 2 exhibits a port vox on message for more than the set master port delay time, a new master port condition occurs. The master port status may be requested by the external room controller 51 whereupon the room controller switches the video from the CODEC to the local room. Similarly, a VCR audio input at the VCR port causes a port vox, and if it becomes the master port and the room controller receives a new master port message, the VCR video can be displayed at the local room. In another example, a port vox message for more than the set master port delay time at port 1 results in a port 1 becoming the new master port. The room controller receives a message indicating that port 1 is the new master port, and thereby causes the CODEC and VCR transmit video to receive the video from the local room. The port vox will also operate in response to a port being turned on and a forced port vox condition selected by manual set-up control. This latter condition causes a particular port such as the mic mixer port 1 to become the default master.

Port Vox Offset

Once a "port vox on" message is generated as a result of any one of the input ports to the audio bridge having a predetermined audio threshold, an offset is produced to increase the thresholds for sensing port vox activity at other ports. This results in more stable port vox and port master messages, to avoid spurious and premature frequent video switching, keeping the video on the principal speaker or audio source.

Antivox

This is a condition that occurs when the output port 1 or port 3 (being the overhead speakers of a room PA channel, if selected for that purpose) exhibit output levels above a predetermined threshold that might cause the undesired gating of local microphones picking up loudspeaker sound. Normally the local room speakers will be presenting audio from another location (far-end) or from a VCR or auxiliary input other than the local room microphones. Feedback or unwanted triggering of microphones may occur as a result of the room's loudspeaker audio. A similar feedback effect may occur when the port 3 output is used as a PA system broadcasting audio to overhead loudspeakers from the active room microphones. The antivox condition is sensed by monitoring at the output level of the port 1 and port 3 outputs through an analog to digital conversion at the master processor of the base unit 11 and broadcasting antivox messages to the expansion mixers to invoke stored precomputed offset values in the expansion mixers. By precomputing and storing these antivox offsets at the mixers, the system directly responds to an antivox message, without need for transmission of the actual offset values. The antivox message commands the additional offset (decrease sensitivity) levels of the microphone input channels at the expansion mixers. This is carried out in the expansion mixer by combining the vox offset and antivox offset in the slave subroutine of FIG. 8.

The antivox threshold level and offset values are recomputed any time the volume levels are changed at the master processor via programming introduced through a set-up computer or changed by the user of a room controller as shown in the flow diagram of FIG. 9.

The master processor includes a "test buffer" routine which receives any change in volume commands such as those initiated by a room controller or installation PC. Such changes in volume commands initiate the computation shown in the separate flow diagram of FIG. 9 for determining the antivox threshold levels and offsets.

Figure 8:
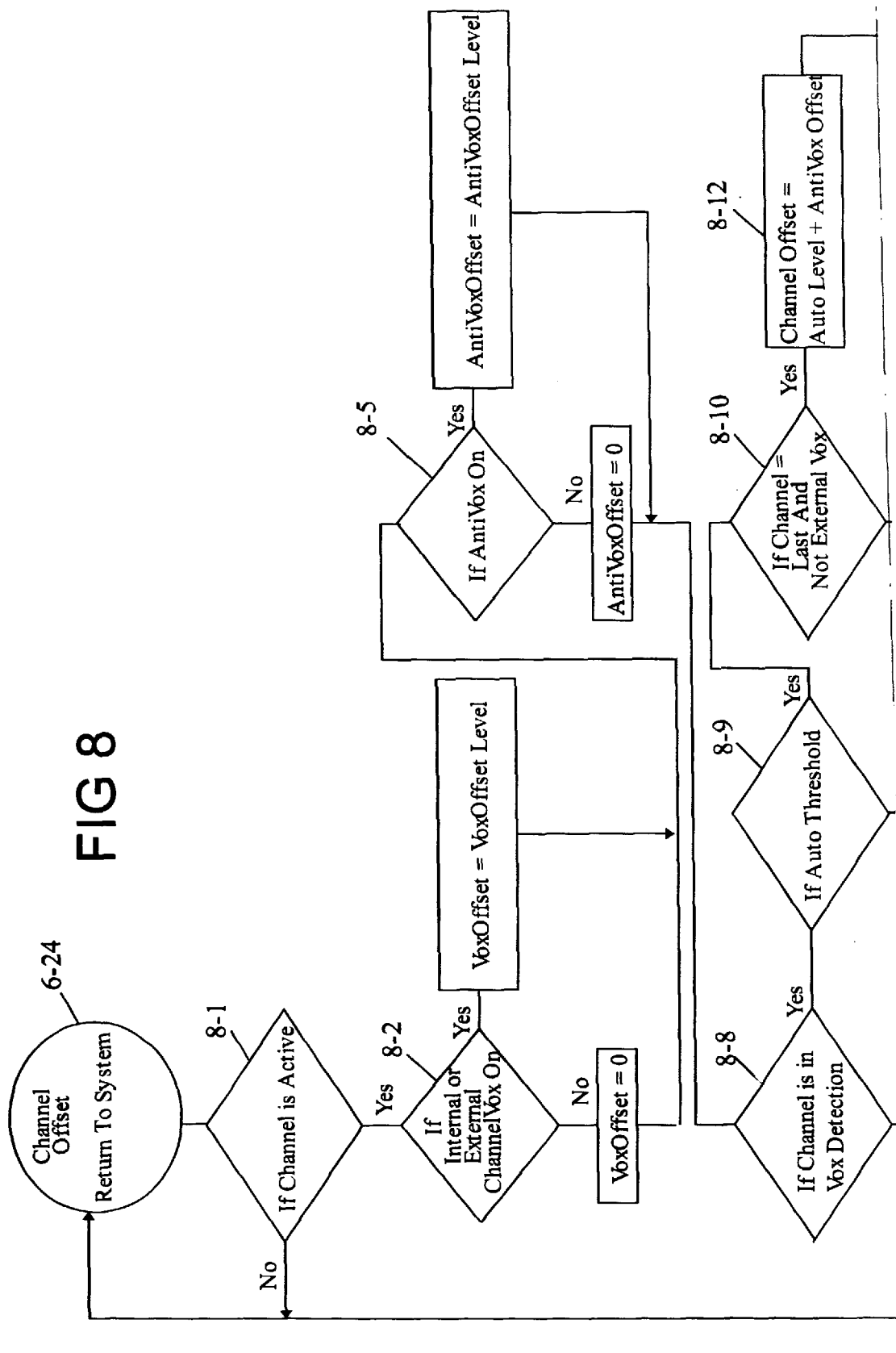
FIG. 8 illustrates a subroutine of the processing by base and slave processors for computing microphone channel thresholds in response to channel vox and output port antivox detection.
Figure 8:
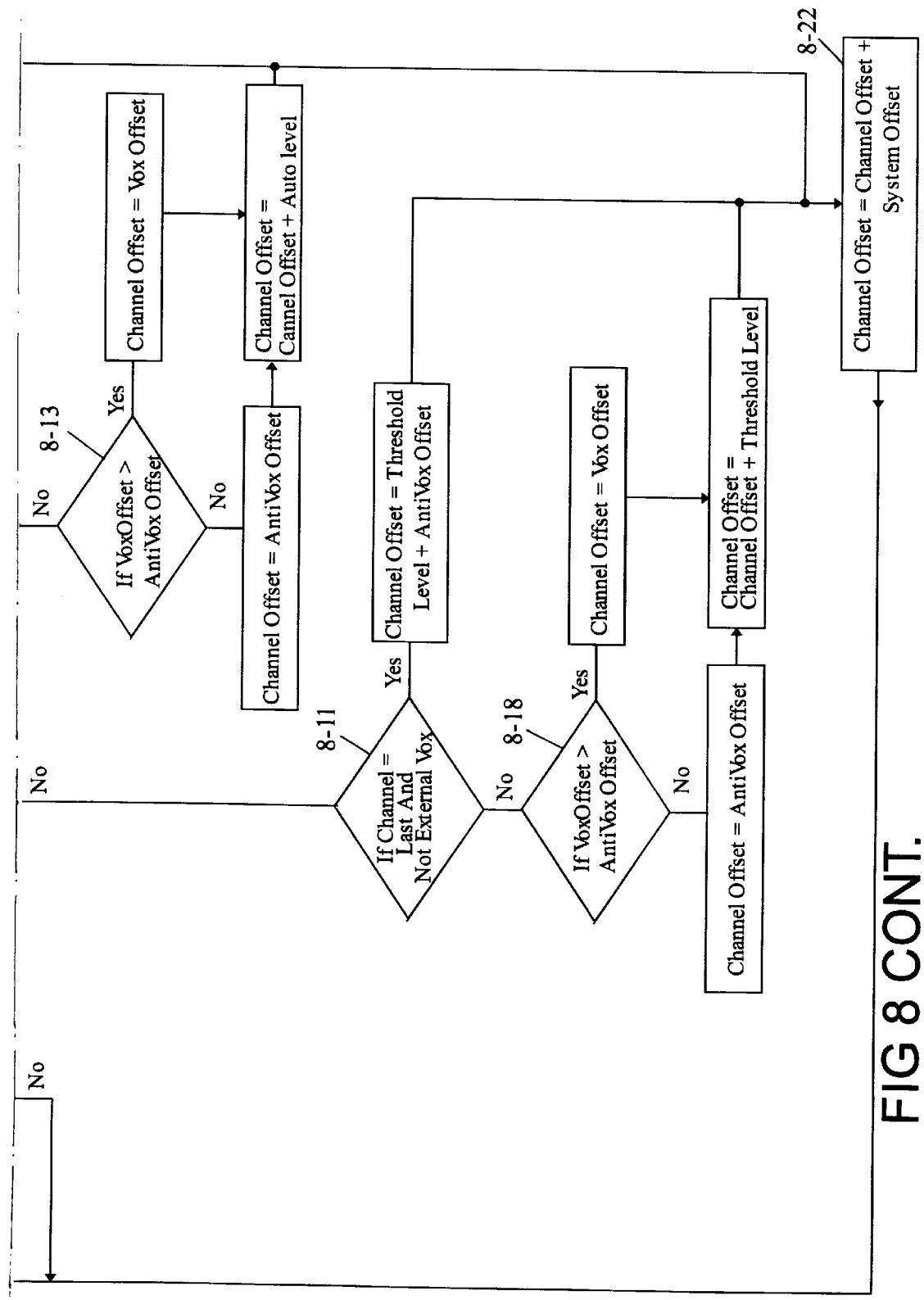

With reference to FIG. 8, the channel vox is calculated whenever the channel is active at 8-1 by determining if there is an internal or external channel vox on condition at 8-2. If yes, then the vox offset is set to the vox offset level and if no, then the processing proceeds to 8-5 where the system checks for antivox on and, if yes, sets the antivox offset to the antivox offset predetermined level. If the antivox is off at 8-5, then the antivox offset is set to zero. The processing then proceeds to 8-8 which determines whether the channel is in vox detection and, if yes, the system determines if the channel is in auto threshold at 8-9. If in auto threshold, the system determines whether the channel is last-on and no external vox at 8-10 in which case the channel offset 8-12 is set to the auto level plus the antivox offset. If at 8-10 the decision is no, then at 8-13 the system determines whether the vox offset is greater than the antivox offset, and the greater value is selected and added to the automatic threshold level to establish the channel offset. If the auto threshold at 8-9 is not on, then the system checks at 8-11 to determine whether the channel is last-on and no external vox. If yes at 8-11, then the channel offset is set to the sum of the threshold level and the antivox offset. If the decision at 8-11 is no, then the system determines whether the vox offset is greater than the antivox offset and the greater value is selected and used for the channel offset which is then added to the threshold level. The channel offset computation then proceeds from decision block 8-9 through 8-10, 8-13, or through 8-11–8-18, and finally to the computation step at 8-22 which combines the computer channel offset with the system offset and returns the processing to the system at 6-24.

With reference to FIG. 9, the antivox offset and antivox threshold is recalculated whenever there is a change in the program loudspeaker volume of port 1. To improve the tracking of the loudspeaker and antivox calculations, the volume level is calculated in a dB log scale that matches the logarithmic functions of the port 1 volume control. The change in volume is calculated by subtracting the volume level that is entered by the room controller from the previous volume 9-2 level at 9-1. If there is a change in volume, the antivox threshold is recalculated by adding the change in volume to the antivox threshold at 9-3, the antivox offset is recalculated by adding the change in volume to the antivox offset at 9-4, and the antivox offset is transmitted to all of the connected expansion mixers at 9-5 through the RS 485 interface.

These threshold offset values and antivox conditions are communicated to the mixers over the RS 485 data channel.

Channel Vox

If a microphone channel is set to active, placed in a vox operation and a microphone channel produces an audio signal at the A/D converters of the slave processor 13-1 above the vox offset level 6-25, a channel vox message is produced. The channel vox message is then used to gate a channel on, produce an offset to other microphone channels, disable the mixer and port 1 noise gates, and inform the room controller of an active microphone channel. If a channel has been gated on due to a channel vox condition, all other channels produce a greater vox offset set by the channel vox offset.

The sensitivity or operation of the input channels and the massaging from the mixer to the base unit for channel vox ("speech on") is described above. In the current embodiment, a maximum number of three channels can be active at any given time at any mixer. This limitation is adopted to avoid overloading the acoustic echo canceller in each mixer which must detect, sort out, and cancel the multiple acoustical paths existing between the room speakers and the associated active microphones for that mixer.

Master Channel

Working in conjunction with the channel vox is a master channel logic that is enabled by placing particular mic channels in a "last-on" condition. The master channel message can be requested by the room controller via the RS 232 type bus. For example, a master channel message will hold the video camera on the associated microphone which may be used by the leader of the discussion or the principal speaker. When speech is no longer detected at the microphone currently indicated as master channel, the base unit broadcasts a channel vox off message after a predetermined release time. Then another microphone channel is available to exhibit a channel vox condition and cause the video follow camera audio switching to go to the new speaker at the new mic channel. If the new channel has also been set to "last-on" and the channel vox message continues at that channel for the duration of the master channel delay timer, then the new channel and speaker will become the master channel and the video camera follows accordingly.

Programmable Mixer Noise Gate Control

In addition to the control of the channel inputs, each mixer has output noise gate 13-5 (see FIG. 4) that is uniquely controlled via the slave processor 13-1 by the number and status of active input microphone channels. This operation of the gated mixer output works outside (after) the signal processing performed by the acoustic echo canceller 13-7.

To reduce the noise and acoustical gain due to the mixing of multiple microphones, mixer noise gate 13-5 is programmable according to the routine 6-34 and is incorporated on the output of each expansion mixer after the echo canceller (see FIG. 10).

To improve the speed and performance of the mixer noise gate, its control is linked to the mixer internal and external vox messages. Linking the noise gate to the vox messages removes the need for a vox gating threshold which adds delay.

There are two functions of the mixer noise gate:

1. master channel (last-on)
2. gated channel

NOM is defined as the number of open microphones or the number of mic channels that are gated on.

Thus with reference to FIG. 10, when the mixer has a current master channel at 10-1:

Internal and external vox on at 10-2

Its output attenuation is set by 10 Log (NOM)+1.5 dB 10-6 for each additional mixer that has a vox on.

External vox on at 10-3

Its output attenuation is set at 10-7 by the mixer depth level.

By default (internal vox on or no vox messages) at 10-8:

Its output attenuation is set by: 10 Log (NOM).

When the mixer is without a current master channel (gated channel) at 10-1:

Internal and external vox on at 10-4

Its output attenuation is set by 10 Log (NOM)+1.5 dB for each mixer 10-9

1.5 dB for each mixer that has a vox on.

External vox on or no vox messages at 10-5

Its output attenuation is set by the mixer depth level 10-10.

By default (internal vox on) at 10-11

Its output attenuation is set by: 10 Log (NOM).

User Programming

In configuring the various channel inputs of the mixer modules, the initial set up selection is to determine whether any given channel is to be active or inactive. An inactive or "off" status causes the attenuation for that input channel to go to the maximum (−100 dB) and in such condition the microprocessor does not monitor the status of that particular input channel. By selecting an active condition for an input, it becomes monitored and further options provide for selection of "last-on" or "gated ", and "auto-mode" (automatic voice detection) or "manual" operation. Assuming the auto-mode has been selected (rather than manual) the active input channel will gate on in response to speech or audio and when it is at or above the adaptive threshold detection level. Also, the gating on of that particular channel produces a speech on condition internal to the mixer, which by itself will control the offsets of the other input channels, and causes a speech on signal to be transmitted to the base unit. This in turn produces in the base unit processor 11-1 a signal called channel vox. The channel vox signal in turn is transmitted back to the mixers and, at least as to the mixers other than the one in which the channel vox was detected, causes an increase of the threshold or offset, decreasing channel sensitivity.

The usual selection for each of the channels will be auto-mode or automatic speech detection. The related set-up options of last-on versus gated determine how the channel and system responds to the automatic gating of a particular channel or channels. Assuming that a particular channel has been selected with the "last-on" mode, that channel can assume a master status or master channel status as follows. Whenever one of the input channels having auto-mode detection and last-on mode selection detects speech for a predetermined delay or timing interval, that particular channel becomes a master. The timing function is carried out in the base master processor 11-1 and when the master status has been attained, the base unit will broadcast a master channel status to the various mixer modules and the room controller. When a master channel status has been attained by a given channel, called the first channel, any other channels detecting speech will be gated on only temporarily during speech detection but will not be able to displace the master channel until the first channel achieving master status has failed to detect speech for a predetermined release time interval and another channel has produced a speech on channel vox condition for the requisite delay time. In other words, a channel that has achieved master status will not lose that status until it becomes inactive for the release time interval and another channel has been active with speech detection for the requisite acquisition time.

Thus assume that speaker 1 at microphone 1 begins to talk and is the main presenter or monitor at the conference. After a period of time, such first input channel will become the master. Other input channels may be gated on as other participants use their microphones for brief presentations, but so long as the main presenter or monitor continues to speak at input channel 1 at frequently reoccuring intervals, the first channel will remain the master.

Those input channels configured for gated on mode cannot achieve master status and will simply gate on and off with the presence of speech.

In addition to these above selection modes and operating functions, each channel can be selected to have a manual operation instead of an automatic speech detection. The manual operation can be one of two options, either forced on or forced off. The forced on condition simulates an input channel that is continuously receiving speech. If that particular channel has been selected for last-on operation, it will become in effect a forced master. If the manual condition of forced on is associated with a gated mode, then the channel will remain on as though permanently detecting speech, but it will not be a master channel and another channel can become a master and hence dominate the video follows audio.

In the manual mode, when the forced off condition is selected, it is as though the input channel is active but no speech is detected.

More than one microphone input channel can be in the last-on mode and they will then compete for the master status as indicated above. Likewise, any one or more of the input channels can be in the gated mode in which they simply turn on and off with speech detection but do not attain master status.

While only particular embodiments have been disclosed herein, it will be readily apparent to persons skilled in the art that numerous changes and modifications can be made thereto, including the use of equivalent means, devices, and method steps without departing from the spirit of the invention.

What is claimed:

1. An audio conferencing control system for full-duplex communication of multiple audio signal sources between near-end and far-end, for use with room microphones that produce near-end audio sources and telecommunication equipment that transmits near-end audio sources to a far-end and receives far-end audio sources for conversion to sound by room loudspeakers, comprising:

a controlled microphone mixer having a mixer output and a plurality of microphone input channel means for receiving and detecting audio signals produced by sound including speech at near-end microphones, and means for selectively gating on each of said microphone input channel means in response to the audio signals and controlled channel thresholds, and signal summing means for combining gated microphone input channel signals from said input channel means into said mixer output;

an echo canceller means at said mixer output for cancelling echo signals due to near-end microphone pick up of far-end audio signal source from a room loudspeaker, said echo canceller means having a reference signal input;

a controlled multiport audio bridge having a plurality of input and output port means including a first input port means connected to the mixer output after said echo canceller means, a second input port means for receiving a far-end audio signal source, a first output port means for applying a far-end audio signal to a room loudspeaker and providing an echo reference signal that is applied to said reference signal input of said echo canceller means, and having a second output port means for outputting a near-end audio program signal for transmission to a far-end location; and control means for controlling said microphone mixer and said multiport audio bridge and having programmable and preprogrammed functions including mixer channel threshold controls and audio bridge port selection controls for selectively bridging said audio bridge input ports to said audio bridge output ports, and having communication means for sending and receiving control and status signals for said mixer and bridge.

2. The audio conferencing control system of claim 1 further comprising an additional controlled microphone mixer for expansion and having an additional plurality of microphone input channel means for receiving and detecting audio signals produced by sound including speech at an associated plurality of near-end microphones, said additional controlled microphone mixer having an additional mixer output;

an additional echo canceller means at said additional mixer output for cancellation of echo signals due to near-end microphone pick up of far-end audio signal source from a room loudspeaker, said additional echo canceller means having an additional reference signal input; and means for connecting said additional reference signal input of said additional echo canceller means to said first output port means of said audio bridge.

3. The audio conferencing control system of claim 1 wherein said control means further comprises:

signal level detecting means for detecting an audio input signal level at each of said microphone input channel means of said mixer;

means for detecting an audio present condition at each of said microphone mixer input channel means when a channel audio input signal level is above a controlled channel threshold;

means for setting separate thresholds at each of said input channel means;

means for gating an input channel means on in response to detected audio present condition;

means for producing an audio present control signal representing said audio present condition for each of said input channel means;

means responsive to said audio present control signal for determining the time duration that an input channel means exhibits said audio present condition;

means for producing a master status control signal representing a master channel status after a predetermined time duration of said audio present condition;

means responsive to said audio present control signal representing each of said input channel means for setting increased thresholds at the remaining input channel means; and means for terminating said master status control signal for an associated input channel means when the audio present control signal for an input channel means has ceased for a predetermined channel release time.

4. The audio conferencing system of claim 3 wherein said control means further comprises port level detection means for detecting the level of an audio signal at each of said input port means of said audio bridge and said control means further having means for producing an active port status signal when said port level detector means detects a port input signal greater than a controlled port threshold at each of said input port means; and means responsive to a first active port status signal for increasing the port threshold at each other input port means of said audio bridge.

5. The audio conferencing control system of claim 4 wherein said control means further comprises means for determining a master port condition including means for detecting the first active port status signal that continues for more than a predetermined master time duration; and said control means includes means for producing a master port status signal representing the master port condition.

6. The audio conferencing control system of claim 1 wherein said control means comprises:

means for detecting an audio input signal level at each of said microphone input channel means of said microphone mixer;

means for gating on each of said microphone mixer input channel means when an input signal level is above a controlled channel threshold;

means for producing an audio present condition status signal when the associated channel input means is gated on;

means for controllably setting separate channel thresholds, one for each of said mixer input channel means; and means for increasing said input channel thresholds by a port output induced channel offset to counteract false detection of an audio present condition at said microphone mixer input channel means when a loudspeaker receives a predetermined level of audio signal level at said first output port means of the audio bridge.

7. The audio conferencing system of claim 6, said control means further comprising means for precomputing and storing port output induced offset values for increasing said input channel thresholds by said port output induced channel offset, and means responsive to said predetermined program audio signal level for adding said port output induced offset values to said means for setting separate channel thresholds.

8. The audio conferencing system of claim 7 wherein said control means comprises a master microprocessor for controlling said multiport audio bridge and a slave microprocessor for controlling said microphone mixer, and wherein said master microprocessor precomputes said port output induced offset values and produces a digital message for causing said port output induced offset values to be added to said channel thresholds by said slave microprocessor whenever said predetermined program audio signal level occurs at said first output port means of the audio bridge.

9. The audio conferencing system of claim 8 further comprising means in said slave processor means for producing input channel offsets for predetermined input channel means after first gating on one of said input channel means of said mixer; and said slave microprocessor means further comprising means for storing said port output induced offset values, and means for adding said port output induced offset values and said input channel offsets to produce increased input channel thresholds.

10. The audio conferencing control system of claim 1 further comprising output signal level detection means at said first output port means of said audio bridge, and said control means includes output threshold detection means for determining when a program audio signal delivered at said first output port means of said audio bridge rises to a predetermined level and means for producing a port antivox status message signal whenever the signal level at said first output port means reaches said predetermined level, and wherein said means for selectively gating on each of said microphone input channel means in response to controlled channel thresholds includes means for increasing said controlled channel thresholds in response to said port antivox status message signal.

11. The audio conferencing control system of claim 1 wherein said control means generates active status signals for each said input port means and communicates said active status signals via said communication means.

12. The audio conferencing control system of claim 11 wherein said control means further includes means for determining a master port status when any of said input port means exhibit said active port status signal for a predetermined master port time delay, and said control means produces a master port status signal and communicates same via said communication means.

13. The audio conferencing control system of claim 1 further comprising signal level detection means at said plurality of input port means of said multiport audio bridge, and said control means includes means for producing an input port active status signal whenever the input level signal detection means at an associated input port means detects an input port signal level above a predetermined port threshold, and said control means including means responsive to said active status signal at any of said input port means to said audio bridge for increasing the threshold detection level of signals applied to any of the other input port means of said audio bridge whereby when one of said input port means exhibits an active status, said increasing the threshold detection level makes it more difficult for the other input port means of said audio bridge to generate an active status signal.

14. An audio conferencing control system for full-duplex communication of multiple audio signal sources between near-end and far-end, for use with room microphones that produce near-end audio sources and telecommunication equipment that transmits near-end audio sources to a far-end and receives far-end audio sources for conversion to sound by room loudspeakers, comprising:

a base unit including a controlled multiport audio bridge having a plurality of input and output port means including a first input port means for connection of mixed microphone sources, a second input port means for connection of a far-end telecommunication signal source, a first output port means for producing a program audio signal to be applied to a room loudspeaker and for producing an echo reference signal output, and a second output port means for outputting an audio program signal for transmission to a far end;

at least first and second microphone mixer expansion modules each having an output, the first mixer expansion module having a first set of microphone input channel means for receiving and detecting sound including speech at a first plurality of room microphones, and having means for selectively gating on each of said first set of microphone input channel means in response to controlled channel thresholds, and having signal summing means for combining gated microphone signals from said first set of input channel means into the mixer output of said first mixer expansion module;

a first echo canceller means at said output of said first mixer expansion module for cancelling echo signals caused by microphone pick up of far-end audio from a room loudspeaker, said first echo canceller means having a reference signal input connected to said reference signal output of said base unit;

the second mixer expansion module having a second set of microphone input channel means for receiving and detecting sound including speech at a second plurality of room microphones, and having means for selectively gating on each of said second set of microphone input channel means in response to controlled channel thresholds, and having a signal summing means for combining gated microphone signals from said second set of input channel means into the mixer output of said second mixer expansion module;

a second echo canceller means at said output of said second mixer expansion module for cancelling echo signals caused by microphone pick up by the second plurality of room microphones of far-end audio from a room loudspeaker, said second echo canceller means having a reference signal input connected to said reference signal output of said base unit; and microprocessor control means in said base unit and in each of said mixer expansion modules for controlling said multiport audio bridge and said mixer expansion modules and having programmable and preprogrammed functions including mixer channel threshold controls for gating said microphone input channel means and audio bridge port selection controls for selectively bridging said input port means to said output port means, and having communication means for sending and receiving control and status signals for said mixer input channel means and for said audio bridge input and output port means.

15. A method of full-duplex communication of multiple audio signal sources between near-end and far-end, using room microphones for producing near-end audio signal sources and telecommunication equipment transmitting near-end audio signal sources to far-end and receiving far-end audio signal sources for conversion to sound by room loudspeakers, comprising the steps of:

mixing of a plurality of microphone input channels that receive and detect sound including speech at near-end microphones, and selectively gating on each of said microphone input channels when signals at said input channels are above controlled channel thresholds, and summing signals from the gated microphone input channels to produce a mixer output;

cancelling echo signals at said mixer output due to near-end microphone pick up of far-end audio signal source from a room loudspeaker;

controlling a multiport audio bridge having a plurality of input and output ports that include a first input port connecting the output of said mixing step after said echo cancelling step, a second input port receiving a far-end audio signal source, a first output port applying a far-end audio signal to a loudspeaker and providing an echo reference signal for use by said echo cancelling step, and having a second output port outputting a near-end audio program signal and transmitting same to a far-end location; and controlling said microphone mixer and said multiport audio bridge by programmable and preprogrammed processes including mixer channel threshold controls and audio bridge port selection controls for selectively bridging said input ports to said output ports, and communicating control and status signals for use in said step of mixing and in controlling said bridge input and output ports.

16. The method of claim 15 further comprising the additional step of mixing an additional plurality of microphone input channels for receiving and detecting sound including speech at an associated additional plurality of near-end microphones, and forming an additional mixer output;

an additional separate step of cancelling echo signals due to pick up by the additional plurality of microphones of far-end audio signal source from a room loudspeaker; and using said echo reference signal jointly in the first mentioned step of cancelling echos and in said additional separate step of cancelling echos.

* * * * *